United States Patent [19]

Zamansky et al.

[11] Patent Number: 5,670,122

[45] Date of Patent: Sep. 23, 1997

[54] METHODS FOR REMOVING AIR POLLUTANTS FROM COMBUSTION FLUE GAS

[75] Inventors: Vladimir M. Zamansky, San Clemente; Loc Ho, Anaheim; William Randall Seeker, San Clemente, all of Calif.

[73] Assignee: Energy and Environmental Research Corporation, Irvine, Calif.

[21] Appl. No.: 652,104

[22] Filed: May 23, 1996

Related U.S. Application Data

[63] Continuation of Ser. No. 311,353, Sep. 23, 1994, abandoned.

[51] Int. Cl.[6] .......................... C01B 21/00; C01B 17/20; C01B 31/18; C07C 11/24
[52] U.S. Cl. .................. 423/210; 423/235; 423/242.4; 423/243.01; 423/245.2; 423/247
[58] Field of Search ..................... 423/235, 242.1, 423/242.4, 243.01, 245.1, 245.2, 246, 247, 210

[56] References Cited

U.S. PATENT DOCUMENTS

| | | | |
|---|---|---|---|
| 4,213,944 | 7/1980 | Azuhata et al. | 423/351 |
| 4,350,669 | 9/1982 | Izumi et al. | 423/400 |
| 4,783,325 | 11/1988 | Jones | 423/235 |
| 4,877,590 | 10/1989 | Epperly et al. | 423/235 |
| 5,151,258 | 9/1992 | Gubanc et al. | 423/235 |
| 5,240,689 | 8/1993 | Jones | 423/235 |

OTHER PUBLICATIONS

Abe, Y., "Removal of Mercury from Flue Gases," *Chemical Abstracts*, vol. 109:175610v.
Abe, Y., "Treatment of Waste Gas from Solid Waste Incineration," *Chemical Abstracts*, vol. 106:218963v.
Brna, T.,"Toxic Metal Emissions from MWCs and Their Control," *Proc. of the 2nd Annual Intern Conf. on Municipal Waste Combustion*, Pittsburgh, pp. 145–161 (Apr. 1991).
Dinelli, G., et al., "Industrial Experiments on Pulse Corona Simultaneous Removal of $NO_x$ and $SO_2$ from Flue Gas," *IEEE Transactions on Industry Applications*, vol. 26, No. 3 May/Jun. 1990, pp. 535–541.
Dismukes, E.B., "Trace Element Control in Electrostatic Precipitators and Fabric Filters," (1993).
Firnhaber, B., et al.,"Process and Apparatus for Separating Metallic Mercury from Gas Obtained by Gasification Combustion of Coal," *Chemical Abstracts*, vol. 114:170390s.
Fukiharu, M., et al., "Method for Removing Mercury from Flue Gases," *Chemical Abstracts*, vol. 109:78980h.
Furukawa, T., et al., "Treatment of Waste Gas from Fusion of Incinerator Wastes," *Chemical Abstracts*, vol. 105:120018v.
Hall, B., et al., "Chemical Reactions of Mercury in Combustion Flue Gases," *Water, Air, and Soil Pollution*, vol. 56, pp. 3–14 (1991).
Helfritch, D., "$SO_2$ and $NO_x$ Removal from Flue Gas by Means of Lime Spray Dryer Followed by Electron Beam Irradiation," *NATO ASI Series, vol. G34, Part B, Non–Thermal Plasma Techniques for Pollution Control*, pp. 34–46 (1993).

(List continued on next page.)

*Primary Examiner*—Wayne Langel
*Attorney, Agent, or Firm*—Workman, Nydegger & Seeley

[57] ABSTRACT

A method is provided for preventing the release of air pollutants with combustion flue gases emitted to the atmosphere by the removal of one or more of nitric oxide, sulfur trioxide, light hydrocarbons, carbon monoxide, and trace amounts of mercury from combustion flue gas streams. The method converts nitric oxide to nitrogen dioxide, sulfur trioxide to sulfur dioxide, removes light hydrocarbons in the form of carbon dioxide, reduces the concentration of carbon monoxide, and removes mercury vapor in the form of mercury oxide, by the addition of hydrogen peroxide or a mixture of hydrogen peroxide and methanol to a combustion flue gas at a temperature in the range from about 650 K (377° C.) to 1100 K (827° C.).

24 Claims, 7 Drawing Sheets

OTHER PUBLICATIONS

Ide, A., et al., "Treatment of Municipal Incineration Flue Gas," *Chemical Abstracts*, vol. 106:72240h.

Kawamata, A., et al., "Mercury Removal from Wastes," *Chemical Abstracts*, vol. 105:48441h.

Liinanki, L., et al., "Mercury Removal from Combustion Gases from the Combustion of Fuels Containg Small Amounts of Mercury," *Chemical Abstracts*, vol. 114:188498t.

Lindau, L., "Purifying Gas Containing Gaseous Mercury," *Chemical Abstracts*, vol. 93:244653b.

Masuda, S., et al., "Control of $NO_x$ by Positive and Negative Pulsed Corona Discharges," *IEEE Transactions on Industry Applications*, vol. 26, No. 2, Mar./Apr. 1990, pp. 374–383.

Meagher, J.F., et al., "The Effect of $SO_2$ Gas Phase Oxidation on Hydroxyl Smog Chemistry," *Atmospheric Environment*, vol. 18, No. 10, pp. 2095–2104 (1984).

Moller, J. T., et al., "Removal of Mercury Vapor and Vapors of Chlorodibenzodioxins and Furans from a Stream of Hot Flue Gas," *Chemical Abstracts*, vol. 106:107322r.

Rasmussen, E.L., "Removal of Mercury Vapor from Waste Gases," *Chemical Abstracts*, vol. 96:11118c.

Sakanaya, K., et al., "Removal of Mercury and Acid Gas from Flue Gases," *Chemical Abstracts*, vol. 108:100469b.

Sakanaya, K., et al., "Waste Gas Treatment for Mercury Removal," *Chemical Abstracts*, vol. 107:204433f.

Shigenaka, T., et al., "Demonstration Study of Mercury Removal from Flue Gas from a Municipal Refuse Incinerator," *Chemical Abstracts*, vol. 110:12837f.

Teller, A.J., et al., "Control of Hospital Waste Incineration Emissions," Case Study, *AWMA*, Vancouver (1991).

Urabe, T., et al., "Laboratory Studies on Mercury Vapor Removal by Pulse Corona Discharge," *Chemical Abstracts*, vol. 110:28485a.

Vogg, H., et al., "Process for Removal of Mercury and Organic Substances from Flue Gases of a Combustion Unit," *Chemical Abstracts*, vol. 110:101010y.

White, D.M., et al., "Municipal Waste Combustors: A Survey of Mercury Emissions and Applicable Control Technologies," *Proc. of the 2nd Annual Intern. Conf. on Municipal Waste Combustion*, Pittsburgh, pp. 652–662 (Apr. 1991).

METHODS FOR REMOVING AIR POLLUTANTS FROM COMBUSTION FLUE GAS

This application is a continuation of U.S. application Ser. No. 08/311,353, filed Sep. 23, 1994, for Methods for Removing Air Pollutants from Combustion Flue Gas, abandoned.

BACKGROUND

1. Field of the Invention

The present invention relates to methods for removal of air pollutants such as nitric oxide (NO), sulfur trioxide ($SO_3$), light hydrocarbons ($C_1$–$C_4$), carbon monoxide (CO), and trace amounts of mercury (Hg) from combustion flue gas. More particularly, the invention relates to methods for conversion of nitric oxide to nitrogen dioxide ($NO_2$), sulfur trioxide to sulfur dioxide ($SO_2$), removal of hydrocarbons in the form of carbon dioxide ($CO_2$), reduction of carbon monoxide, and removal of mercury vapor in the form of mercury oxide (HgO) by the addition of hydrogen peroxide or a mixture of hydrogen peroxide and methanol to combustion flue gas under certain conditions.

2. The Relevant Technology

The major air pollutants emanating from boilers, furnaces, incinerators, engines and other combustion sources, are $NO_x$, $SO_x$, carbon monoxide (CO), and various carbon containing compounds. $NO_x$ is produced in the form of nitric oxide (NO). Some nitrogen dioxide ($NO_2$) is also formed, but its concentration is less than 5% of the total $NO_x$ which is typically 200–1000 ppm. The combustion of coal, oil and other sulfur containing fuels produces a flue gas in which 98–99% of the sulfur is in the form of sulfur dioxide ($SO_2$) and 1–2% is sulfur trioxide ($SO_3$). For low and high sulfur coals the total concentration of $SO_x$ is usually in the range of 1,000–4,000 ppm. The concentrations of CO and unburned hydrocarbons depend on combustion regimes and can reach several hundred ppm and more.

The above listed air pollutants are the subject of growing concern because they are either toxic compounds or the precursors to acid rain deposition and photochemical smog. A variety of technologies have been developed to reduce the pollutant emissions, but these technologies have substantial disadvantages and a need exists to develop novel concepts for improving the effectiveness of air pollution control and for reducing its cost. Some problems with the existing post-combustion air pollution control technologies are considered below.

If it is necessary to reduce the emissions of $NO_x$ from a boiler or furnace below what can be achieved by combustion modifications, there are two kinds of post-combustion $NO_x$ control technologies: Selective Catalytic Reduction (SCR) and Selective Non-Catalytic Reduction (SNCR). SCR processes are based on the reaction of NO and $NO_2$ with ammonia in the presence of a catalyst forming nitrogen and water. These methods are effective within a narrow flue gas temperature window which depends on the catalyst. Other concerns regarding the application of SCR are the following: high cost, risk of catalyst poisoning and thermal shock, spent catalyst disposal, and risk of ammonia leakage to the atmosphere. SNCR methods include the injection of $NH_i$ radical precursors: ammonia (Thermal $DeNO_x$ process), urea or cyanuric acid at temperatures of about 1250 K. SNCR also involves the reactions of $NH_3$ or its derivatives with $NO_x$, but in the absence of catalysts. The main areas of concern are ammonia breakthrough, a narrow operating temperature window, and reduced efficiency of $NO_x$ removal in the presence of CO.

There are other non-catalytic post-combustion $NO_x$ control methods that are currently under development, such as conversion of NO into $NO_2$ followed by simultaneous scrubbing of $NO_2$ and $SO_2$ from combustion flue gas. Since flue gas desulfurization (FGD) systems are required for $SO_2$ removal after combustion of sulfur containing fuels and it has been proven that $NO_2$ can be removed efficiently in sodium-based wet scrubbers or in modified calcium-based $SO_2$ scrubbers, the conversion of NO into $NO_2$ becomes a promising strategy for combined $NO_x$ and $SO_x$ removal.

Wet scrubbing methods of $NO_x$ reduction are limited by the relatively inert nature of NO—. This difficulty can be overcome by oxidation of NO to much more reactive $NO_2$. Oxygen is not useful for NO oxidation at flue gas conditions because their interaction is very slow and characteristic times of their reaction are several orders of magnitude larger than the flue gas residence times in post-combustion channels. An attractive method of NO to $NO_2$ oxidation by injection of methanol ($CH_3OH$) into flue gas was invented by R. K. Lyon, *Method for Preventing Formation of Sulfuric Acid and Related Products in Combustion Effluents*, U.S. Pat. No. 4,849,192, which is incorporated herein by reference (hereinafter referred to as the "Lyon Patent"). Methanol reacts with NO by means of a chain reaction, and the main elementary step for NO conversion is the rapid reaction of NO with $HO_2$ radicals:

$$NO + HO_2 \rightarrow NO_2 + OH \quad (1)$$

Unfortunately, a problem with using methanol is the formation of CO as a by-product. Each molecule of NO converted into $NO_2$ produces a molecule of CO, and at relatively low methanol injection temperatures, CO is not oxidized to $CO_2$.

Azuhata et al., *Effect of $H_2O_2$ on Homogeneous Gas Phase NO Reduction Reaction with $NH_3$*, AIChE J. v. 28, No. 1, p. 7 (1982), which is incorporated herein by reference, presented data on NO-to-$NO_2$ conversion by interaction with hydrogen peroxide, but the reaction times ($t_r$) in their experiments were approximately 12 seconds, which is not applicable to air pollution control.

There are a variety of effective dry and wet FGD technologies based on scrubbing by or injection of basic compounds, such as lime, limestone, sodium salts, etc. From an air pollution control viewpoint the best existing FGD technologies are quite satisfactory although a need of a cheaper process always exists. But in terms of boiler/furnace operation, the production of small amounts of $SO_3$ is a problem. When the flue gas cools, the $SO_3$ reacts with water to form a mist of sulfuric acid which causes corrosion of equipment. Another $SO_3$ problem is that if the Thermal $DeNO_x$ process is used for $NO_x$ removal from $SO_x$-containing flue gas, the remaining $NH_3$ reacts with $SO_3$ and water to form $NH_4HSO_4$, a sticky and highly corrosive compound that can also cause plugging. Methanol injection can successfully handle the $SO_3$ problems because $CH_3OH$ does a double job: it simultaneously converts NO to $NO_2$ and $SO_3$ to $SO_2$. The principal elementary reaction for $SO_3$-to-$SO_2$ conversion is the interaction of $SO_3$ with $HO_2$ radicals followed by $HSO_3$ decomposition:

$$SO_3 + HO_2 \rightarrow HSO_3 + O_2 \quad (2)$$

$$HSO_3 + M \rightarrow SO_2 + OH + M \quad (3)$$

Just as for NO to $NO_2$ conversion, $HO_2$ radicals are the active species for $SO_3$ removal. The only remaining problem in the use of methanol is CO production. Therefore, it would be of great benefit to find another additive instead of methanol to convert $SO_3$ to $SO_2$ without forming dangerous by-products.

There is a relationship between NO and CO emissions that plays an important role in air pollution control: the higher the peak combustion temperature, the higher the concentration of NO that is formed, the lower CO production. At relatively low combustion temperatures, NO production is minimized but increased levels of CO form. At high enough temperature, in ideal mixing conditions and in an excess of air, all CO would be oxidized to $CO_2$, but the combustion processes in various applications are far from ideal conditions and the problem of CO emission still exists. The main elementary reaction that converts CO to $CO_2$ in combustion gases is $$CO+OH \rightarrow CO_2+H \qquad (4)$$

Therefore, additional concentrations of hydroxyl radicals can improve CO removal, and chemical additives producing OH radicals can be useful.

According to chemical kinetics calculations, CO and hydrocarbons burn out in the excess of air, but in practical applications they are formed or not burned out. Emissions of hydrocarbons are dangerous for human health and reduce combustion efficiency. As does CO, hydrocarbons react rapidly with OH radicals in the gas phase. These reactions produce different organic radicals which are oxidized by $O_2$. Thus, OH radicals can enhance the removal of organic compounds.

Mercury emissions from combustion sources have recently been a growing environmental concern. High mercury concentrations have been found in various locations and objects. For example, fish tested from a large number of lakes have been found to contain mercury at levels that make the fish unsuitable to eat. As these lakes do not have a local source of mercury, the cause of the high levels of mercury are most likely from direct deposition from the air.

Currently, elemental mercury (Hg) and different forms of gaseous and particulate mercury compounds, such as mercury oxide (HgO), mercury chlorides ($HgCl_2$ and $Hg_2Cl_2$), etc., are emitted to the atmosphere from various plants having combustion sources. If those plants are equipped with a particulate control device, such as dry or wet electrostatic precipitators (ESP), most of the oxidized mercury compounds are removed as particles. Elemental mercury, however, is the most volatile mercury form, and increases the atmospheric background concentration when emitted. It has been reported that mercury emissions from waste-to-energy plants range from 0 to about 100 ppb. The average concentration of mercury in flue gases from coal combustion plants in the United States is expected to be about 3 ppb.

Presently, there are two groups of methods for mercury vapor removal. The first group of methods relates to adsorption or absorption by solid or liquid substances. One approach in this first group has been to treat the entire flow of flue gases by passage through adsorbents or absorbents. Another approach in this group of methods has been to inject carbon into a flue gas stream in order to effect mercury adsorption. The second group of methods relates to chemical conversions to non-volatile mercury compounds followed by their collection in a particulate control device. For example, there are chemical methods of mercury removal which involve the injection of a sodium polysulfide solution into flue gas and passing the flue gas through a so-called "selenium filter". These methods were recently described by Dismukes, E. B., *Trace Element Control in Electrostatic Precipitators and Fabric Filters*, Proc. of the International Workshop "Trace Elements Transformations in Coal-Fired Power Systems", Scottsdale, Ariz., April 1993, which is incorporated herein by reference. All existing methods of mercury removal are expensive and not highly effective.

At combustion temperatures, all mercury is probably in the form of atoms because the mercury compounds are not very stable. As the flue gases cool and reach temperatures between 600° and 700° C., the oxidation of mercury to HgO can occur. It has been found, however, that oxygen itself is not a suitable oxidant under flue gas conditions. The reaction of mercury with oxygen that is usually present in flue gas, $Hg+0.5O_2=HgO$, is too slow to remove a significant amount of mercury.

As was described by Masuda, et al., *Pulse Corona Induced Plasma Chemical Process for DeNO$_x$, DeSO$_x$ and Mercury Vapor Control of Combustion Gas*, Proc. of the 3d Intern. Conf. on Electrostatic Precipitation, Abano-Padova, Italy, October 1987, pp. 667–676, which is incorporated herein by reference, in the presence of corona discharge, an efficient mercury removal of up to 90+% can be achieved. In this case, mercury reacts with more energetic forms of oxygen, probably with molecular ion $O_2^+$ or with excited $O_2$ molecules, and this process is thermodynamically and kinetically favorable, however, a high energy consumption is required. Therefore, there is a need for an improved method of mercury removal from gas streams that overcomes the above problems.

The consideration of the emissions control problems concerning $NO$-to-$NO_2$ conversion, $SO_3$-to-$SO_2$ conversion, CO and organic compound removal, shows that OH and $HO_2$ radicals play important roles in pollution control reactions in combustion gases. It would be of great economic and environmental benefit to find an additive to be injected into combustion gases and capable of producing additional OH and $HO_2$ radicals. Such a process combined with simultaneous $NO_2$ and $SO_2$ scrubbing would be a step forward in the effective control of the main air pollutants. It would make it easier to control multiple emissions and it would increase the utilization of sulfur containing fuels, both coal and oil. It would be a related advancement to convert mercury vapor to less volatile mercury oxide for its subsequent removal by ESP. If $HO_2$ radicals can rapidly react with mercury atoms, the additive which forms $HO_2$ radicals could also remove Hg vapor. Such additives and apparatus are disclosed and claimed below.

SUMMARY OF THE INVENTION

In view of the present state of the art, it is an object of the present invention to provide a method for removing NO from combustion flue gas before it is emitted to the atmosphere.

It is another object of the present invention to quickly and efficiently oxidize NO to more reactive $NO_2$ for its removal by different scrubbing methods.

It is a further object of the present invention to convert NO to $NO_2$ without forming other air pollutants.

It is also another object of the present invention to provide a method for removing $SO_3$ from gas streams in the form of $SO_2$.

It is also another object of the present invention to convert $SO_3$ to $SO_2$ for its removal by different scrubbing methods.

It is a further object of the present invention to remove $SO_3$ from gas streams to reduce corrosion of industrial equipment.

It is also another object of the present invention to remove $SO_3$ from flue gas for increasing thermal efficiency of power plants by lowering the $SO_3$ dewpoint and by enlargement of the air heater.

It is also another object of the invention to provide a method for preventing the formation of sulfuric acid in combustion flue gas.

It an additional object of the present invention to remove hydrocarbons from gas streams by oxidizing them to $CO_2$.

It is also another object of the present invention to reduce the concentration of CO in combustion flue gas by oxidizing CO to $CO_2$.

It a further object of the present invention to reduce the concentration of CO in gas streams during injection of methanol by substitution of a part of methanol with hydrogen peroxide.

It is also another object of the present invention to reduce the cost of using hydrogen peroxide by its partial substitution with methanol without exceeding required CO levels.

It is still another object of the present invention to provide a method for quickly and efficiently oxidizing mercury vapor in gas streams before emitting into the atmosphere so as to be able to remove mercury in the form of the less volatile HgO.

Additional objects and advantages of the present invention will be apparent from the description and claims which follow, or may be learned by the practice of the invention.

In accordance with the foregoing objects and advantages, the present invention is a method for the removal of multiple air pollutants from combustion flue gas streams, such as the gas components including one or more of NO, $SO_3$, CO, light hydrocarbons, and mercury vapor. The method comprises the step of contacting the gas components with hydrogen peroxide ($H_2O_2$) in an amount such that the mole ratio of the hydrogen peroxide to the sum of any such NO, $SO_3$, CO, light hydrocarbons and mercury vapor contained in the combustion flue gas is in the range from about 0.5 to about 2.0. The hydrogen peroxide substantially converts the NO, $SO_3$, CO, light hydrocarbons, and mercury vapor in the combustion flue gas to $NO_2$, $SO_2$, $CO_2$, and HgO. In an alternative embodiment, a mixture of hydrogen peroxide and methanol can be used in the above method.

The method of the invention can be accomplished by injecting a concentration of hydrogen peroxide or a $H_2O_2$/$CH_3OH$ mixture into the flue gas, and allowing the chemicals to react within the flue gas for a sufficient time so as to convert one or more of NO, $SO_3$, CO, light hydrocarbons, and mercury to $NO_2$, $SO_2$, $CO_2$, and HgO. The combustion flue gas can further comprise initial concentrations of carbon dioxide, water and oxygen. Preferably, the chemicals are injected into the flue gas at a temperature within the range from about 650 K (377° C.) to about 1100 K (827° C.). Temperatures that are significantly outside of this range tend to greatly reduce the effectiveness of the process. The reaction time of the $H_2O_2$ or $H_2O_2$/$CH_3OH$ mixture should be in the range from about 0.01 to about 5 seconds, preferably from about 0.1 to about 2 seconds. The $NO_2$, $SO_2$, and HgO can then be removed from the flue gas. The hydrogen peroxide or $H_2O_2$/$CH_3OH$ mixture can be injected into the flue gas upstream of a particulate control device.

Small additions of hydrogen peroxide, in either a gas or liquid form, have been found to remove NO, $SO_3$, hydrocarbons, CO, and mercury vapor from the flue gas. When injected into a flue gas stream, the hydrogen peroxide or $H_2O_2$/$CH_3OH$ mixture comprises less than about 1,000 ppm of the total gas stream, and preferably less than about 500 ppm of the total gas stream.

The mechanisms of air pollutants removal include different chain reactions. These processes occur when the reactions between the air pollutants and $HO_2$ or OH radicals exist:

$$NO + HO_2 \rightarrow NO_2 + OH \qquad (1)$$

$$SO_3 + HO_2 \rightarrow HSO_3 + O_2 \qquad (2)$$

$$CH_4 + OH \rightarrow H_2O + CH_3 \qquad (5)$$

$$CO + OH \rightarrow CO_2 + H \qquad (4)$$

$$Hg + HO_2 \rightarrow HgO + OH \qquad (6)$$

The above reactions occur when hydrogen peroxide or a $H_2O_2$/$CH_3OH$ mixture is injected into combustion flue gas at temperatures of about 650 K (377° C.) and higher. Initially, the hydrogen peroxide dissociates into two hydroxyl radicals by the reaction:

$$H_2O_2 + M \rightarrow OH + OH + M \qquad (7)$$

This reaction thus serves as a chain initiation step. The OH radicals that are formed then react either with air pollutants, such as CO and hydrocarbons (reactions 4 and 5), or with another molecule of $H_2O_2$ via a rapid chain propagating reaction of:

$$OH + H_2O_2 \rightarrow HO_2 + H_2O \qquad (8)$$

Once this reaction occurs, the $HO_2$ radicals return OH radicals through the reactions with NO (reaction 1), $SO_3$ (reaction 2), and Hg (reaction 6) to form $NO_2$, $HSO_3$, and HgO as stated above. The $HSO_3$ molecules dissociate under these conditions to form $SO_2$ and return OH radicals:

$$HSO_3 + M \rightarrow SO_2 + OH + M \qquad (3)$$

As discussed above, the amount of $H_2O_2$ or a $H_2O_2$/$CH_3OH$ mixture injected into gas streams should be in the approximate mole ratio from about 0.8 to about 2.0 with respect to the sum of the air pollutants: NO, $SO_3$, CO, hydrocarbons, and mercury vapor. In most applications, the preferable mole ratio will be from about 0.9 to about 1.5.

BRIEF DESCRIPTION OF THE DRAWINGS

In order that the manner in which the above-recited and other advantages and objects of the invention are obtained, a more particular description of the invention briefly described above will be rendered by reference to the appended drawings. Understanding that these drawings are not to be considered limiting of its scope, the invention will be described and explained with additional specificity and detail through the use of the accompanying drawings in which.

DETAILED DESCRIPTION OF THE INVENTION

Figure 1A:
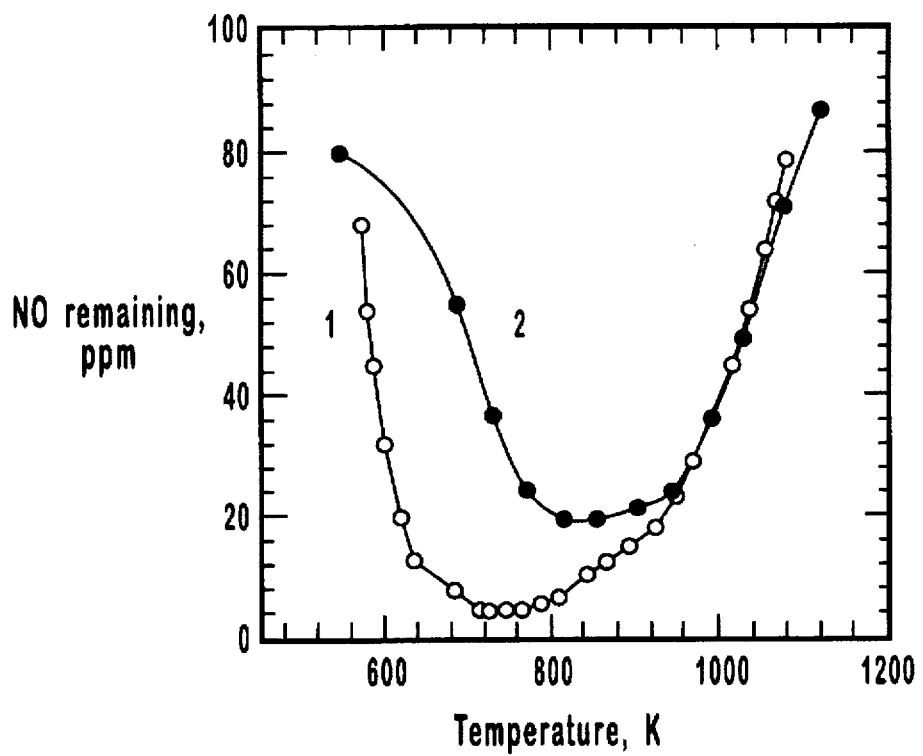
FIGS. 1A and 1B are graphs representing the experimental (a) and modeling (b) data for NO-to-$NO_2$ conversion by $H_2O_2$ injection. $t_r$(reaction time)=1.0–2.0 s; mixture (1): 100 ppm NO, (160+220) ppm $H_2O_2$, 4.2% $O_2$, 5.4% $H_2O$, balance $N_2$; mixture (2): 100 ppm NO, (90+120) ppm $H_2O_2$, 4.4% $O_2$, 1.9% $H_2O$, balance $N_2$.
Figure 1B:
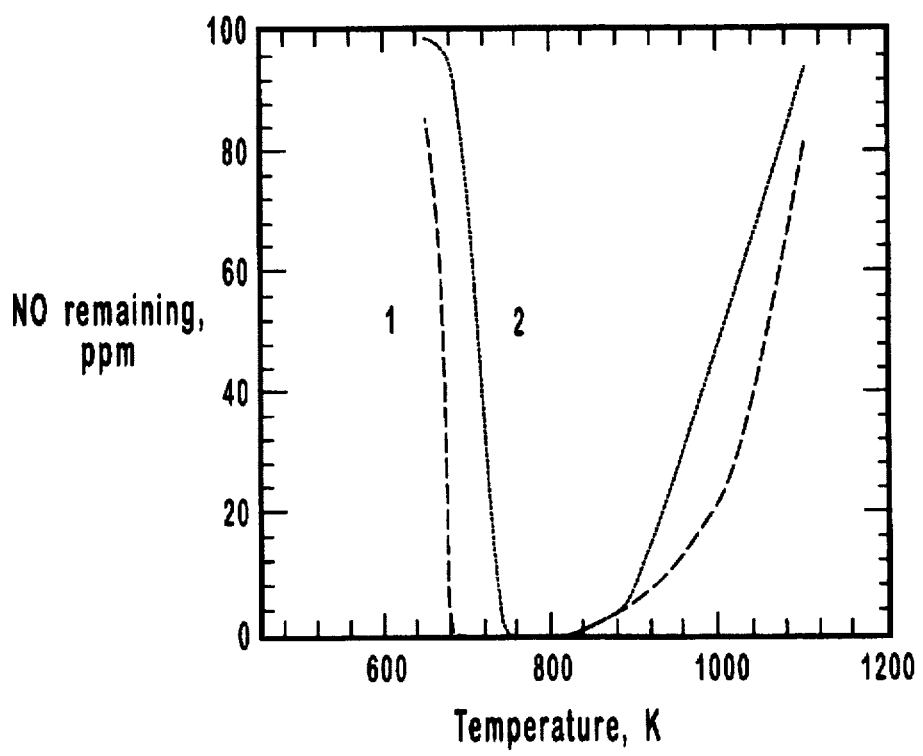

As will be appreciated by consideration of the following description as well as the accompanying Figures, the inventive concepts of the present invention may be embodied in different forms. The presently preferred embodiment described herein represents the presently preferred best mode for carrying out the invention. Nevertheless, many embodiments, or variations of the preferred embodiment, other than those specifically detailed herein, may be used to carry out the inventive concepts described in the claims appended hereto.

According to the present invention, a novel method for selective non-catalytic reduction of multiple air pollutants in gas streams involves different homogeneous gas-phase chain reactions. The method of the present invention comprises injecting hydrogen peroxide or a $H_2O_2/CH_3OH$ mixture into a combustion flue gas stream in order to convert unreactive NO to much more reactive $NO_2$, corrosive $SO_3$ to $SO_2$, CO and light hydrocarbons to $CO_2$, and mercury vapor to the less volatile mercury oxide. The method of the invention can further comprise the step of removing the $NO_2$, $SO_2$, and HgO from the flue gas. The use of hydrogen peroxide to provide OH and $HO_2$ radicals allows removal of multiple air pollutants in the form of more stable or more reactive compounds, which are then easier to remove by other methods.

Small additions of hydrogen peroxide, which can be either in a gas or liquid form, have been found to remove NO, $SO_3$, hydrocarbons, CO, and mercury vapor from the combustion flue gas. When injected into a flue gas stream, the hydrogen peroxide or $H_2O_2/CH_3OH$ mixture comprises less than about 1,000 ppm of the total gas stream, and preferably less than about 500 ppm of the total gas stream. The initial concentration of NO in the flue gas is up to about 1000 ppm, while the initial concentration of $SO_3$ in the flue gas is up to about 100 ppm. The initial concentration of CO in the flue gas is up to about 500 ppm, while the initial concentration of light hydrocarbons in the flue gas is up to about 1000 ppm. The initial concentration of Hg in the flue gas is less than about 1 ppm. The combustion flue gas can further include initial concentrations of carbon dioxide, water and oxygen.

The present invention provides a quick and efficient method of removing one or more of NO, $SO_3$, CO, light hydrocarbons, and mercury emitted from different sources such that these air pollutants are not emitted into the atmosphere in dangerously high concentrations. For example, the present invention can be used to remove the air pollutants in flue gases emanating from boilers, furnaces, incinerators, stationary engines, and other systems connected with combustion of fossil fuels. The process can also be used for multiple air pollutants control in industrial gases containing the air pollutants.

The amount of hydrogen peroxide and methanol which must be used is directly related to the total amount of the air pollutants present in the gas streams. Accordingly, it is important to the present invention to provide enough hydrogen peroxide and methanol to accomplish substantial reduction of the air pollutants, but not enough hydrogen peroxide to cause its unnecessary consumption and not enough methanol to exceed the required limits for CO emissions. The total amount of hydrogen peroxide and methanol used in combination with the gas streams will generally be in the mole ratio of from about 0.5 to about 2.0, but in most applications from about 0.9 to about 1.5 of the total air pollutants. NO concentrations are usually much more easily measured than $SO_3$ concentrations and Hg concentrations. The amount of NO in combustion flue gases is much larger than the amount of $SO_3$ and several orders of magnitude larger than the amount of Hg vapor. Hence, in most situations, it is both acceptably accurate and more convenient to control the amount of the additives used with relationship to the relatively total amount of NO, CO, and hydrocarbons without addition of $SO_3$ and Hg concentrations.

The temperature at which the chemicals are introduced into the gas stream must be carefully controlled in order to produce the desired results. It is presently preferred that the temperature be within the range of about 650 K (377° C.) to about 1100 K (827° C.). When the temperature is significantly below 650 K (377° C.), it has been found that the hydrogen peroxide will not form enough OH radicals to support the chain reactions and the air pollutants will not be removed.

This is also true for excessively high temperatures. When the temperature is higher than about 1100 K (827° C.), the hydrogen peroxide dissociates faster than the reactions with air pollutants can occur. On the other hand, at higher temperatures, the concentration of hydrocarbons and CO can be reduced by the oxidation reactions with oxygen. At higher temperatures, NO and $SO_3$ concentrations can be reduced by the reactions with methanol.

It is presently preferred that reaction times be held within the range from about 0.01 to about 5 seconds, and most preferably from about 0.1 to about 2 seconds. The preferred reaction time will vary with the temperature at which the reaction occurs.

According to the present invention, hydrogen peroxide can be injected preferably in the form of an aqueous solution having a concentration of about 1% to 50%, and more preferably from about 10 to 30%. Hydrogen peroxide can be also injected as a mixture of H₂O₂ solution and methanol. The use of H₂O₂ and methanol mixtures is presently preferred because methanol is very low in cost. The methanol to H₂O₂ ratio should be as high as possible to reduce the cost of the additive, but to satisfy CO emission requirements.

In one embodiment of the present invention, aqueous H₂O₂ or a solution of H₂O₂ and methanol is atomized by a jet of gas and then propelled into the combustion flue gas by the jet of gas. The vaporization of the liquid droplets is a process requiring a finite time. Hence, contacting the chemicals with the flue gas occurs not immediately upon injection but only after some delay.

When the present invention is used in combination with SNCR $NO_x$ reduction technologies, the hydrogen peroxide or $H_2O_2/CH_3OH$ mixture and the combustion flue gas contact downstream of the zone in which the combustion effluents are contacted with a SNCR reducing agent. The hydrogen peroxide or $H_2O_2/CH_3OH$ mixture can also be injected into the flue gas upstream of a particulate control device.

It is well known that complex chemical reactions occur by a series of elementary reactions, and that if one knows the rate constants of such steps a theoretical kinetic mechanism can be developed and used to calculate the behavior of the reaction under any set of conditions. Mechanisms describing the decomposition of $H_2O_2$, oxidation of light hydrocarbons and their oxygenates, such as methanol, the interaction of NO and other nitrogen compounds at high temperatures, and the interaction of sulfur compounds have been developed in different chemical kinetics studies. Assembling these mechanisms produces a total kinetic mechanism to describe the chemical reactions of this invention. Such a mechanism is assumed in the examples set forth below.

Figure 7:
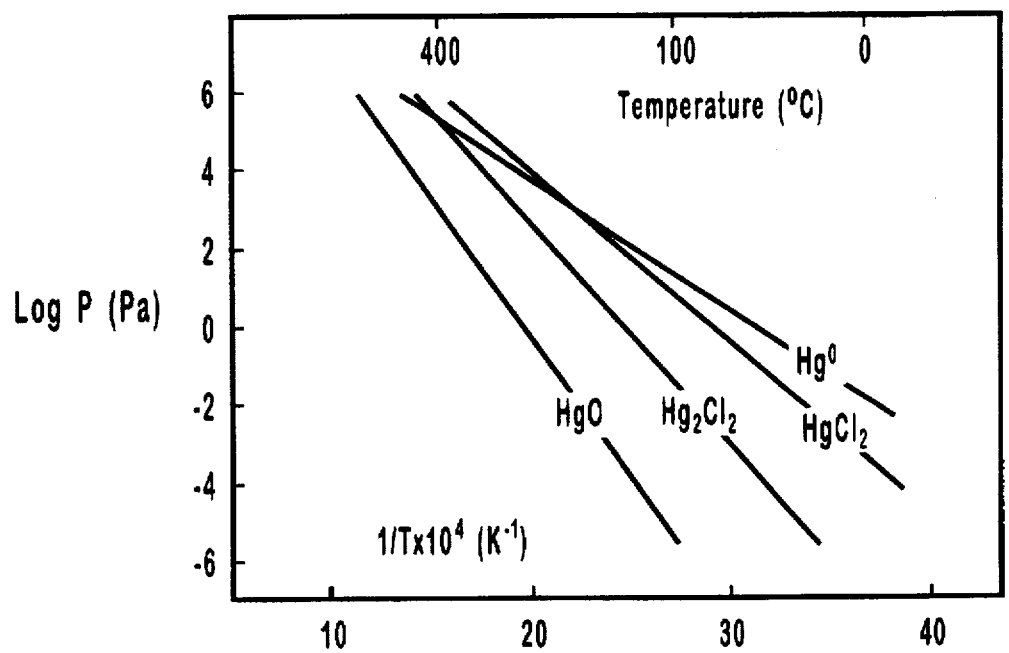
FIG. 7 is a graph representing the temperature dependence of vapor pressure over condensed phase for most important mercury compounds. These data are taken from Hall et al., *Mercury Chemistry in Simulated Flue Gases Related to Waste Incineration Conditions*, Environ. Sci. Technol., 1990, V. 24, pp. 108–111, which is incorporated herein by reference.

The temperature dependence of vapor pressure over condensed phase for most important Hg compounds is presented in FIG. 7. At temperatures lower than 170° C., mercury vapor is the most volatile and dominating constituent in the gas phase of the compounds listed. A mercury vapor concentration in flue gas of about 10 ppm and less, is well below the saturation pressure. Therefore, in the absence of a chemical or physical mercury control process, mercury vapor will be emitted to the atmosphere.

Mercury oxide is a less volatile compound as compared to mercury. At 150° C., the saturation HgO pressure is about 10 ppb. At 100° C., the saturation HgO pressure is about 100 ppt. At 50° C., the saturation HgO pressure is about 0.1 ppt. If the HgO concentration exceeds these levels, HgO will form solid particles which can be removed in conventional fashion, such as by ESP. Therefore, depending on working temperatures of particulate control devices and on initial mercury concentrations, conversion of elemental mercury into HgO is a possible way for mercury removal.

The use of hydrogen peroxide in the present invention has many advantages. If properly stored, hydrogen peroxide solutions in water are very stable. The use of hydrogen peroxide does not pose any environmental problems since hydrogen peroxide is not itself a source of pollution, and the only reaction by-products are water and oxygen. Therefore, hydrogen peroxide can be used safely in the present invention.

Once the H₂O₂ is injected into combustion flue gas, the hydrogen peroxide dissociates into two hydroxyl radicals by the following reaction:

$$H_2O_2+M \rightarrow 2OH+M \qquad (7)$$

The hydroxyl radicals formed have several reaction routes. First, they can react with H₂O₂ molecules to form HO₂ radicals:

$$OH+H_2O_2 \rightarrow H_2O+HO_2 \qquad (8)$$

Second, OH radicals interact with carbon-containing compounds, such as CO, CH₄, CH₃OH, and other organics:

$$OH+CO \rightarrow CO_2+H \qquad (4)$$

$$OH+CH_4 \rightarrow H_2O+CH_3 \qquad (5)$$

$$OH+CH_3OH \rightarrow H_2O+CH_2OH \qquad (9)$$

followed by oxidation reactions:

$$H+O_2 \rightarrow OH+O \qquad (10)$$

$$CH_3+O_2 \rightarrow CH_2O+OH \qquad (11)$$

$$CH_2OH+O_2 \rightarrow CH_2O+HO_2 \qquad (12)$$

which increases concentrations of active species. Under these high-temperature conditions, CH₂O formed is converted to CO, CO₂, and H₂O via a CH₂O—O₂ chain reaction. Total stoichiometry of the CH₄/O₂ reaction is well known:

$$CH_4+2O_2=CO_2+2H_2O \qquad (13)$$

and it is promoted in the presence of OH radicals. As known from the literature, H₂O₂ enhances oxidation of different organic compounds due to the chain processes involving OH and other active species. For instance, it was found by Cooper et al., Enhancement of Organic Vapor Incineration Using Hydrogen Peroxide, J. Hazard. Mat., 27, 273–285, 1991, which is incorporated herein by reference, that injection of H₂O₂ in dilute air mixtures of heptane and isopropanol increases the rate of their destruction at T=910–1073 K (637°–800° C.) and $t_r$=0.26–0.94 s.

Third, the OH radicals participate in chain termination steps, such as $OH+HO_2 \rightarrow H_2O+O_2$, $OH+OH+M \rightarrow H_2O_2+M$, etc.

Thus, the reaction (7) serves as a chain initiation step, and once the OH radicals are formed, they can then react with H₂O₂ through the chain propagation reaction step (8). Once this reaction occurs, the HO₂ radicals return OH radicals through the reactions with air pollutants. Both OH and HO₂ radicals play an important role in pollutants reduction.

Figure 2A:
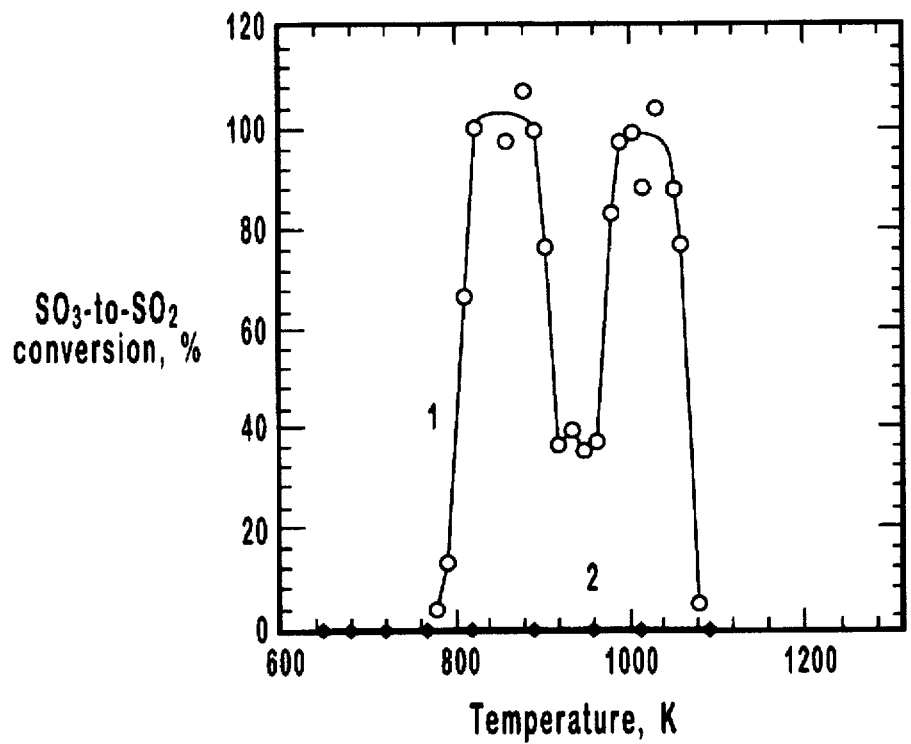
FIGS. 2A and 2B are graphs representing experimental (a) and modeling (b) data for $SO_3$-to-$SO_2$ conversion by $H_2O_2$ injection. $t_r$=1.0–1.6 s; mixture (1): 100 ppm $SO_3$, (160+220) ppm $H_2O_2$, 4.2% $O_2$, 5.4% $H_2O$, balance $N_2$; mixtures (2–5) are the same but with different amounts of $H_2O_2$: (2) without $H_2O_2$, (3) 100 ppm $H_2O_2$, (4) 200 ppm $H_2O_2$, (5) 500 ppm $H_2O_2$.
Figure 2B:
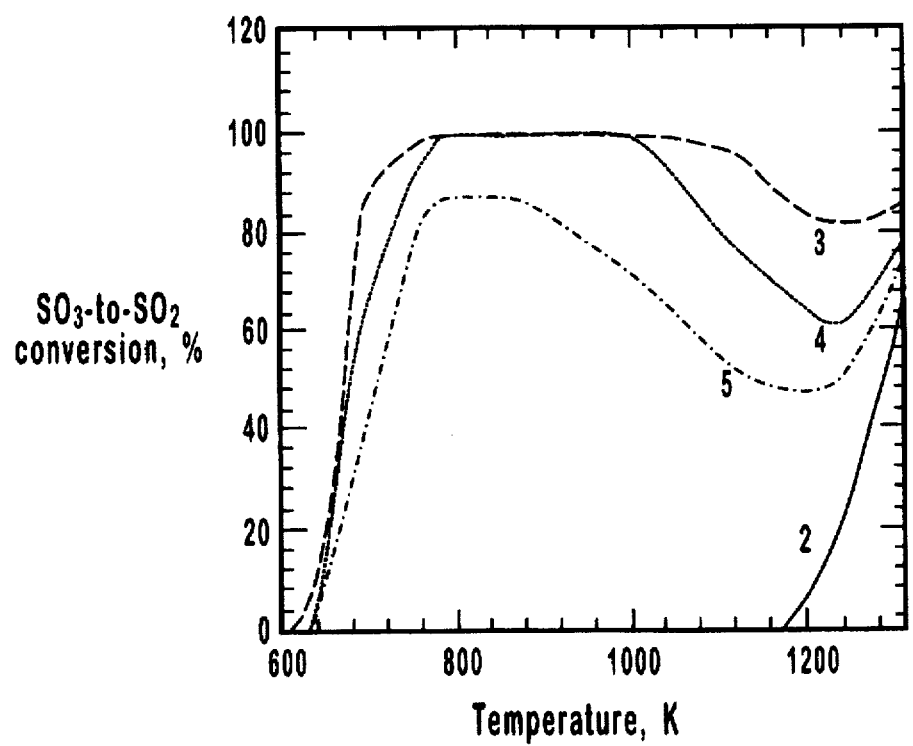
Figure 3A:
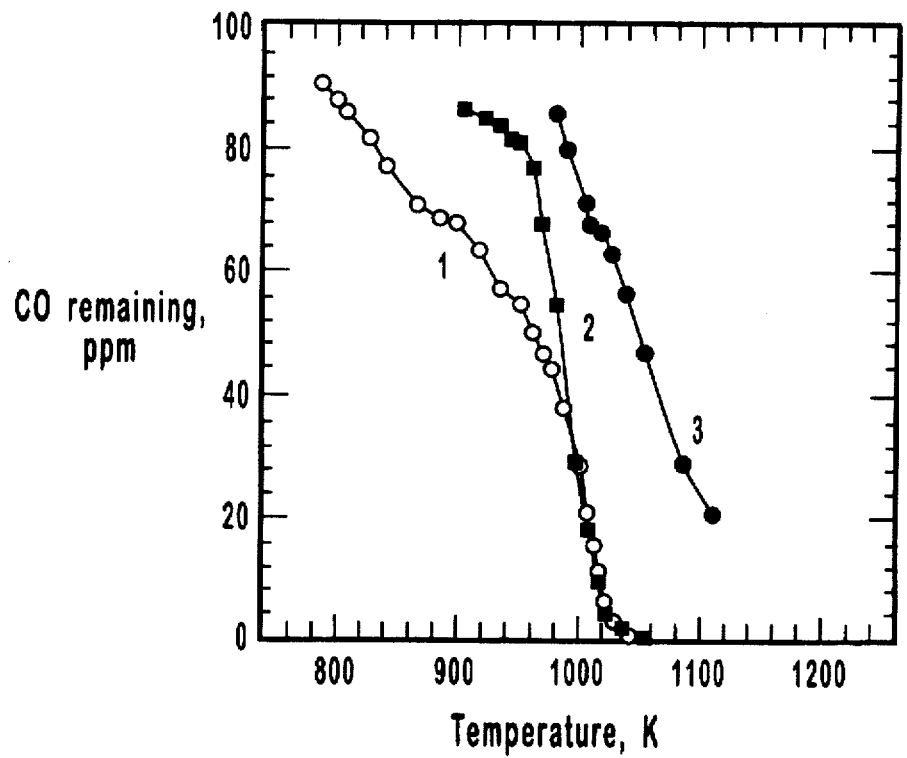
FIGS. 3A and 3B are graphs representing experimental (a) and modeling (b) data for CO oxidation by $H_2O_2$ injection. $t_r$=1.0–1.5 s; mixture (1): 90 ppm CO, (160+220) ppm $H_2O_2$, 4.2% $O_2$, 5.4% $H_2O$, balance $N_2$; mixture (2): 90 ppm CO, 4.2% $O_2$, 5.4% $H_2O$, balance $N_2$; mixture (3): 90 ppm CO, 4.2% $O_2$, balance $N_2$ (10 ppm $H_2O$ in modeling).
Figure 3B:
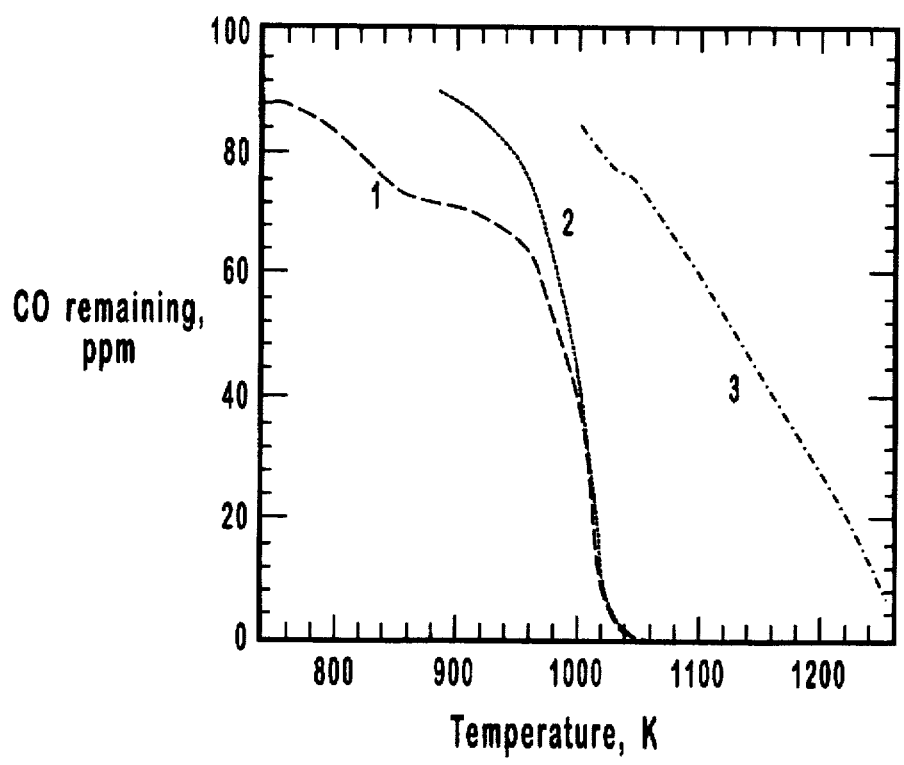
Figure 4A:
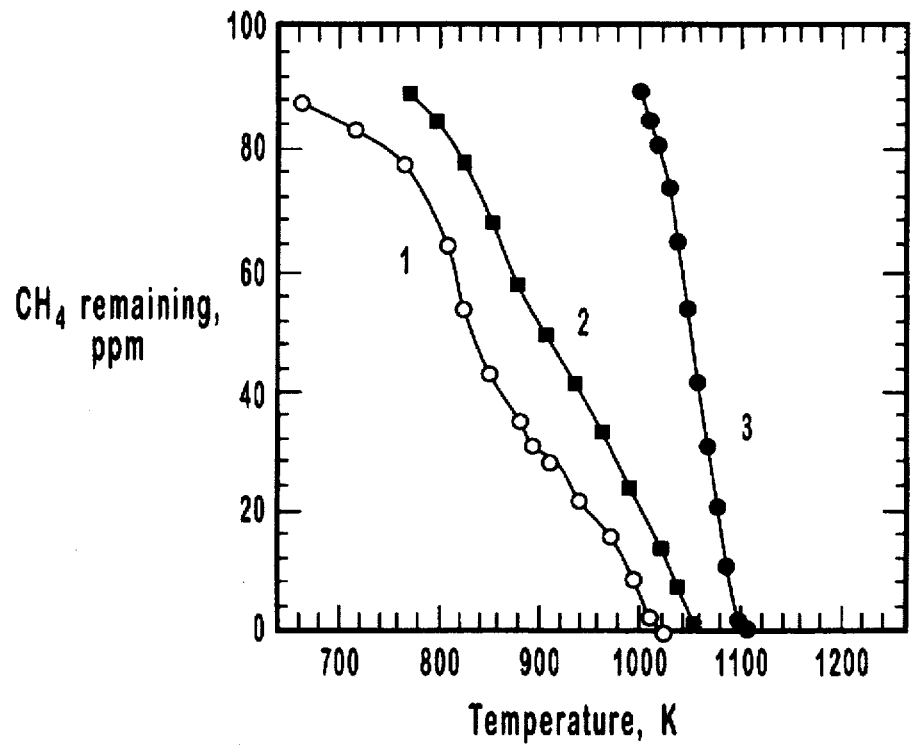
FIGS. 4A and 4B are graphs representing experimental (a) and modeling (b) data for $CH_4$ oxidation by $H_2O_2$ injection. $t_r$=1.0–1.8 s; mixture (1): 90 ppm $CH_4$, (160+220) ppm $H_2O_2$, 4.2% $O_2$, 5.4% $H_2O$, balance $N_2$; mixture (2): 90 ppm $CH_4$, (90+120) ppm $H_2O_2$, 4.4% $O_2$, 1.9% $H_2O$, balance $N_2$; mixture (3): the same as (1) but without $H_2O_2$.
Figure 4B:
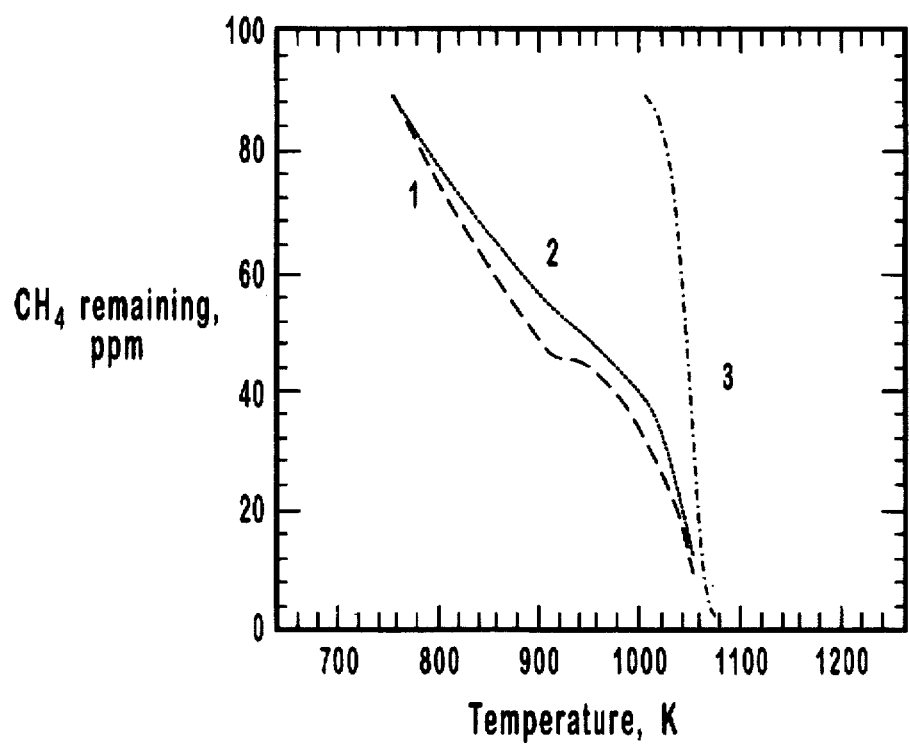
Figure 5A:
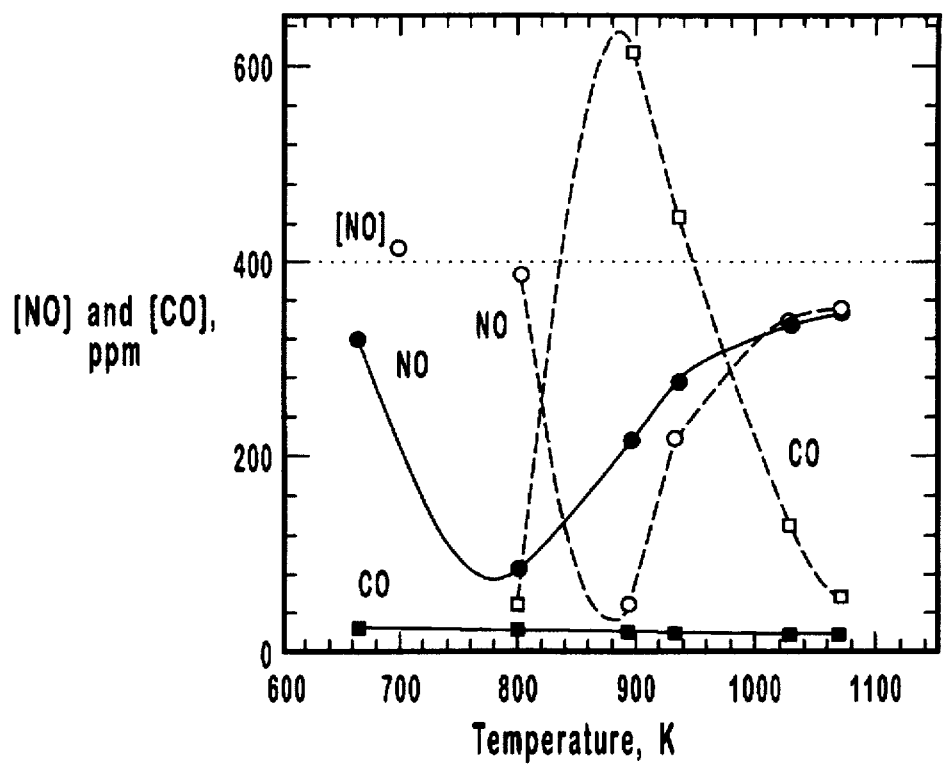
FIGS. 5A and 5B are graphs representing pilot-scale measurements of NO and CO concentrations after injection of $H_2O_2$ (solid curves) and methanol (dash curves). [Additive]/[NO]=1.5, $[CO]_0$=24 ppm, (a) $[NO]_0$=400 ppm, (b) $[NO]_0$=200 ppm.
Figure 5B:
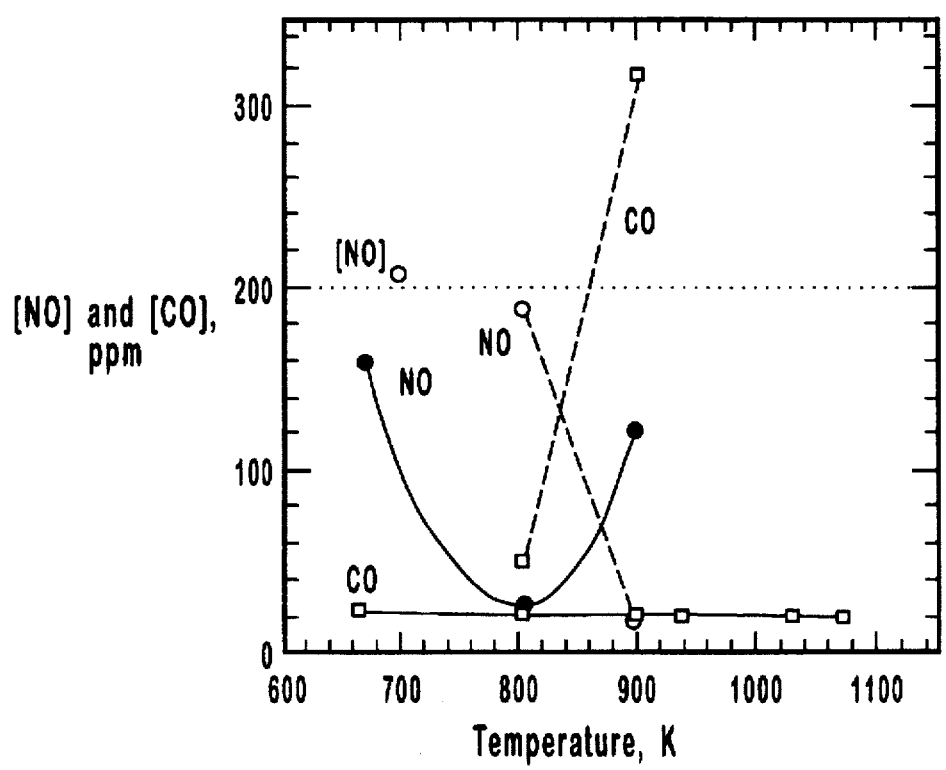
Figure 6A:
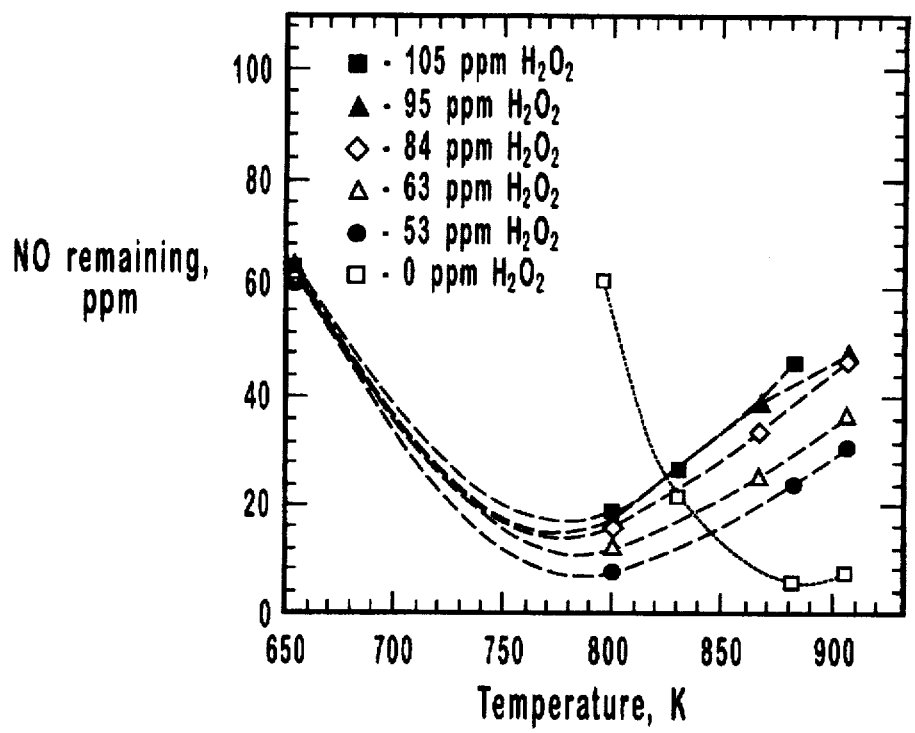
FIGS. 6A and 6B are graphs representing pilot-scale measurements of NO and CO concentrations after injection of $H_2O_2/CH_3OH$ mixtures. $([H_2O_2]+[CH_3OH])/[NO]_0$=1.5, $[NO]_0$=70 ppm, $[CO]_0$=30 ppm, (a) temperature windows for various $H_2O_2/CH_3OH$ mixtures, (b) NO and CO concentrations at 800 K (527° C.) (at $[H_2O_2]$=0 data are shown for 866 K (593° C.)).
Figure 6B:
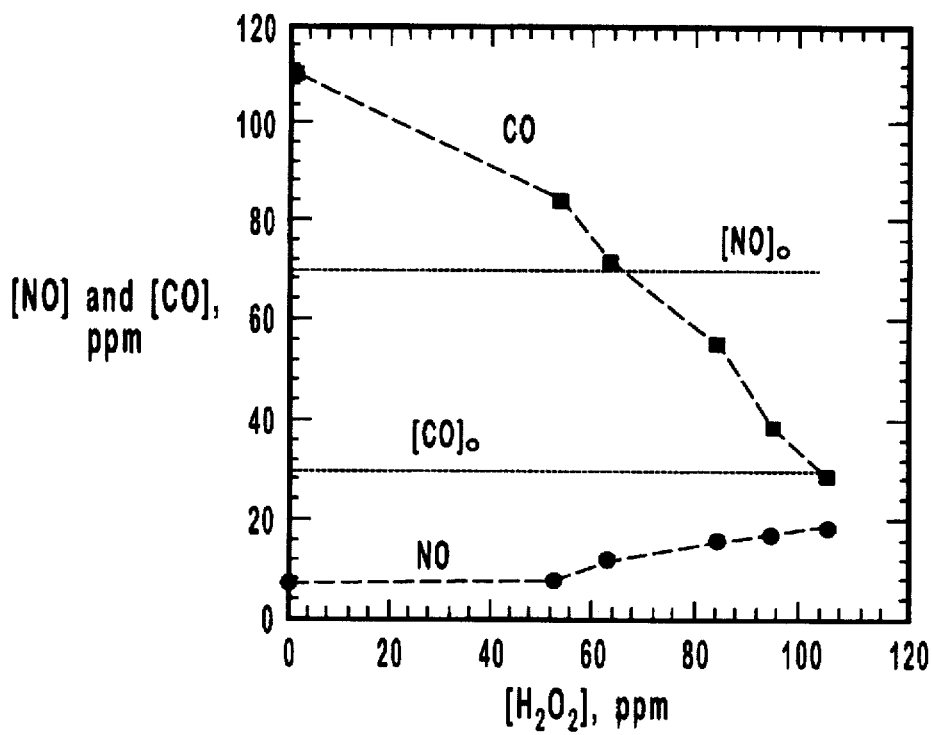

Comparison of modeling and experimental results (FIGS. 1A and 1B through FIGS. 4A and 4B) is complicated because of H₂O₂ surface reactions although the heterogeneous H₂O₂ decomposition is taken into account in modeling. Nevertheless, modeling at least qualitatively describes all substantial features of NO, SO₃, CO and CH₄ reduction except the minimum of the SO₂ curve (FIG. 2B). Most likely, this minimum is not a result of homogeneous chemical reactions that can be checked in future tests.

Both modeling and experimental results show that NO is not converted to NO₂ in the absence of H₂O₂, but SO₃, CO, and CH₄ are converted to SO₂ and CO₂ at higher temperatures even without H₂O₂ addition (curves 2, 3 and 3 in FIGS. 2B, 3A and 3B, 4A and 4B, respectively). However, in non-ideal practical combustion systems all these pollutants (SO₃ and carbon-containing compounds) are present in flue gas, and H₂O₂ injection will reduce their concentrations.

The pilot-scale tests on NO-to-NO₂ conversion (FIGS. 5A, 5B and 6A, 6B) confirmed that performance of H₂O₂ injection is higher when the influence of surface reactions is lower. Very low initial CO levels in the pilot-scale tests (24–30 ppm) did not allow to demonstrate CO reduction. Maximum CO reduction in the laboratory tests (FIG. 3A) was only about 20% (2–3 ppm for pilot experiments), which is close to the CO detection limit.

The position of the $H_2O_2$ temperature window is approximately in the same range for all pollutants: between 650–1100 K (377°–827° C.), with maximum performance between 700–1000 K (427°–727° C.). The position of the $H_2O_2$ temperature window is defined by the chemical nature of $H_2O_2$ reactions. At temperatures lower than 650 K (377° C.), the homogeneous $H_2O_2$ decomposition is very slow and OH and $HO_2$ radicals are not formed. At temperatures higher than 1100 K (827° C.), concentrations of all radicals in the system become very high, and the rate of recombination reactions which are quadratic on radical concentration prevails in the rate of their reactions with molecules. As a result, $H_2O_2$ dissociates into hydroxyl radicals very rapidly, and the radicals disappear in the recombination processes. An important factor is also the decomposition of $HO_2$ radicals at temperatures higher than 1000 K. Thus, $H_2O_2$ is active only in the temperature range of about 650–1100 K (377°–827° C.).

The most important chain reactions that are responsible for reduction of air pollutants are as follows:

NO removal:

| | |
|---|---|
| OH + $H_2O_2$ → $H_2O$ + $HO_2$ | (8) |
| $HO_2$ + NO → $NO_2$ + OH | (1) (chain reaction) |

$SO_3$ removal:

| | |
|---|---|
| OH + $H_2O_2$ → $H_2O$ + $HO_2$ | (8) |
| $HO_2$ + $SO_3$ → $HSO_3$ + $O_2$ | (2) |
| $HSO_3$ + M → $SO_2$ + OH + M | (3) (chain reaction) |

CO reduction:

| | |
|---|---|
| OH + CO → $CO_2$ + H | (4) |
| H + $O_2$ → OH + O | (10) (chain reaction) |

$CH_4$ reduction:

| | |
|---|---|
| the reaction $CH_4$ + $2O_2$ = $CO_2$ + $2H_2O$ is promoted in the presence of OH radicals. | (13) (chain reaction) |

Hg removal:

| | |
|---|---|
| OH + $H_2O_2$ → $H_2O$ + $HO_2$ | (8) |
| $HO_2$ + Hg → HgO + OH | (6) (chain reaction) |

Thus, five various chain reactions are involved, and the single reagent of hydrogen peroxide can provide the reduction of multiple air pollutants.

Figure 8:
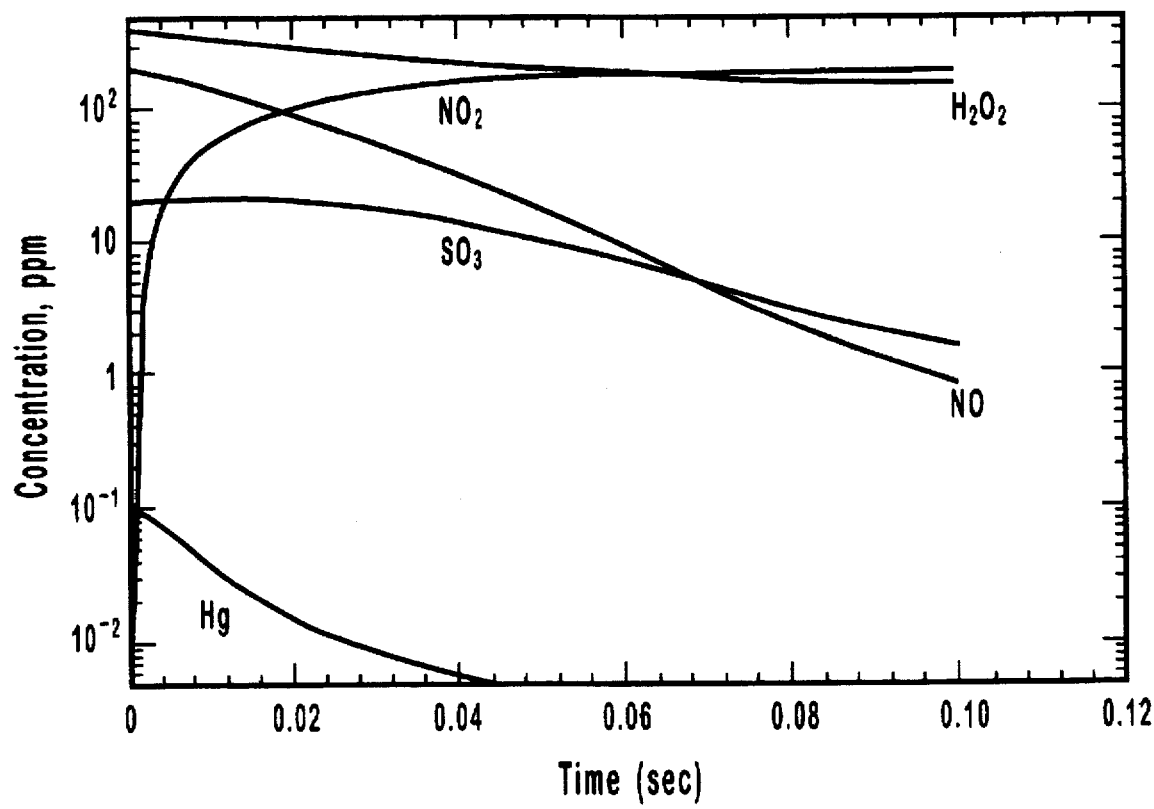
FIG. 8 is a graph representing a kinetic modeling of mercury removal by hydrogen peroxide injection at a temperature of 800 K (527° C.).

The mechanism of mercury vapor removal includes a chain reaction between mercury and hydrogen peroxide. This process occurs when the chain propagation elementary reaction between mercury atoms and $HO_2$ radicals exists. The reaction that occurs is believed to be the second chain propagation reaction:

$$HO_2 + Hg \rightarrow HgO + OH \quad (6)$$

and once the chain reaction has occurred, much of the Hg is converted to HgO. The HgO can then be precipitated out and removed safely, without sending dangerous Hg vapor into the atmosphere. Thus, when the reaction (6) takes place, mercury is effectively removed from gas streams. It is believed that this reaction may occur with a rate constant close to the collision frequency with the rate constant of about $10^{13.5}$ cc/mol.s. Hydrogen peroxide is used to provide oxygen atoms to be bonded with mercury atoms. According to the method of the present invention, the hydrogen peroxide is injected into the flue gas at temperatures of about 650 K (377° C.) and higher. FIG. 8 is a graph representing a kinetic modeling of mercury removal by hydrogen peroxide injection at a temperature of 800 K (527° C.). It has been found that at temperatures lower than 650 K (377° C.), the $H_2O_2$ is stable and does not produce the desired radicals within a reaction time of several seconds. Conversely, at temperatures too high (above about 1100 K (827° C.)), the $H_2O_2$ dissociates too fast.

The methods of the present invention allow for the removal of $SO_3$ from gas streams to reduce corrosion of industrial equipment, and to increase thermal efficiency of power plants by lowering the $SO_3$ dewpoint and by enlargement of the air heater. The methods of the invention also prevent the formation of sulfuric acid in combustion flue gas.

EXAMPLES

The following examples are given to illustrate the process of the present invention, but the examples are not intended to limit the scope of the present invention.

Chemical kinetics calculations can describe the reactions of hydrogen peroxide with different air pollutants. Kinetic modeling was used to describe and to test the reactions that take place in the method of the invention and to compare the performance of $H_2O_2$ with experimental data. Table I below presents the chemical reaction mechanism that was used for kinetic modeling. The mechanism includes usually accepted reactions of $H_2$—$O_2$ interaction, $SO_3$—$SO_2$ reactions, $NO_x$ formation and destruction, and $CH_4$ oxidation reactions. Rate constants ($k_i$) for $NO_x$—$H_2$—$O_2$—$CH_4$ reactions were taken from Miller, J. A. and Bowman, C. T., *Mechanism and Modeling of Nitrogen Chemistry in Combustion*, Progr. Energy and Combust. Sci., v. 15, pp. 287–338 (1989), which is incorporated herein by reference. Other rate constants were taken from the *NIST Chemical Kinetics Database*, Version 5 (1993) which is incorporated herein by reference. The rate constant for mercury interaction with $HO_2$ radicals was varied in modeling. The CHEMKIN-II kinetic program developed by Sandia National Laboratories was used for modeling. Reverse reactions were also taken into account.

TABLE I

Chemical mechanism which was used for modeling
$k_i = A \cdot T^n \exp(-E/RT)$ (kcal, cm, mol, s)
ELEMENTS: H, O, N, C, S.
SPECIES: $CH_4$, $CH_3$, $CH_2$, CH, $CH_2O$, HCO, $C_2H$, $CO_2$, CO, $H_2$, H, $O_2$, O, OH, $HO_2$, $H_2O_2$, $H_2O$, C, $C_2H_4$, $C_2H_3$, $C_2H_5$, $C_2H_6$, $C_2H_2$, $CH_3O$, $CH_2OH$, $N_2$, NO, N, NH, $NH_2$, HNO, HCN, NCO, CN, $N_2O$, NNH, $NH_3$, $N_2H_2$, $C_2N_2$, $NO_2$, $HNO_2$, HOCN, HCNO, HNCO, $SO_2$, $SO_3$, $HSO_3$, $O_3$, $CH_3OH$, $H_2O_2$(wall).

| REACTIONS | A | n | E |
|---|---|---|---|
| $CH_3$ + $CH_3$ = $C_2H_6$ | 9.03E16 | −1.2 | 654 |
| $CH_3$ + H + M = $CH_4$ + M | 8.0E26 | −3.0 | 0 |
| $H_2/2/$ CO/2/ $CO_2/3/$ $H_2O/5/$ | | | |
| $CH_4$ + $O_2$ = $CH_3$ + $HO_2$ | 7.9E13 | 0.0 | 56000 |
| $CH_4$ + H = $CH_3$ + $H_2$ | 2.2E4 | 3.0 | 8750 |
| $CH_4$ + OH = $CH_3$ + $H_2O$ | 1.6E6 | 2.1 | 2460 |
| $CH_4$ + O = $CH_3$ + OH | 1.02E9 | 1.5 | 8604 |
| $CH_4$ + $HO_2$ = $CH_3$ + $H_2O_2$ | 1.8E11 | 0.0 | 18700 |
| $CH_3$ + $O_2$ = $CH_3O$ + O | 2.05E18 | −1.57 | 29229 |
| $CH_3$ + $HO_2$ = $CH_3O$ + OH | 2.0E13 | 0.0 | 0 |
| $CH_3$ + O = $CH_2O$ + H | 8.00E13 | 0.0 | 0 |
| $CH_2OH$ + H = $CH_3$ + OH | 1.0E14 | 0.0 | 0 |
| $CH_3O$ + H = $CH_3$ + OH | 1.0E14 | 0.0 | 0 |
| $CH_3$ + OH = $CH_2$ + $H_2O$ | 7.5E6 | 2.0 | 5000 |
| $CH_3$ + H = $CH_2$ + $H_2$ | 9.0E13 | 0.0 | 15100 |
| $CH_3O$ + M = $CH_2O$ + H + M | 1.0E14 | 0.0 | 25000 |
| $CH_2OH$ + M + $CH_2O$ + H + M | 1.0E14 | 0.0 | 25000 |

TABLE I-continued

Chemical mechanism which was used for modeling
$k_i = A \cdot T^n \exp(-E/RT)$ (kcal, cm, mol, s)
ELEMENTS: H, O, N, C, S.
SPECIES: $CH_4$, $CH_3$, $CH_2$, CH, $CH_2O$, HCO, $C_2H$, $CO_2$, CO, $H_2$, H, $O_2$, O, OH, $HO_2$, $H_2O_2$, $H_2O$, C, $C_2H_4$, $C_2H_3$, $C_2H_5$, $C_2H_6$, $C_2H_2$, $CH_3O$, $CH_2OH$, $N_2$, NO, N, NH, $NH_2$, HNO, HCN, NCO, CN, $N_2O$, NNH, $NH_3$, $N_2H_2$, $C_2N_2$, $NO_2$, $HNO_2$, HOCN, HCNO, HNCO, $SO_2$, $SO_3$, $HSO_3$, $O_3$, $CH_3OH$, $H_2O_2$(wall).

| REACTIONS | A | n | E |
|---|---|---|---|
| $CH_3O + H = CH_2O + H_2$ | 2.0E13 | 0.0 | 0 |
| $CH_2OH + H = CH_2O + H_2$ | 2.0E13 | 0.0 | 0 |
| $CH_3O + OH = CH_2O + H_2O$ | 1.0E13 | 0.0 | 0 |
| $CH_2OH + OH = CH_2O + H_2O$ | 1.0E13 | 0.0 | 0 |
| $CH_3O + O = CH_2O + OH$ | 1.0E13 | 0.0 | 0 |
| $CH_2OH + O = CH_2O + OH$ | 1.0E13 | 0.0 | 0 |
| $CH_3O + O_2 = CH_2O + HO_2$ | 6.3E10 | 0.0 | 2600 |
| $CH_2OH + O_2 = CH_2O + HO_2$ | 1.48E13 | 0.0 | 1500 |
| $CH_2 + H = CH + H_2$ | 1.0E18 | -1.56 | 0 |
| $CH_2 + OH = CH_2O + H$ | 2.5E13 | 0.0 | 0 |
| $CH_2 + OH = CH + H_2O$ | 1.13E7 | 2.0 | 3000 |
| $CH + O_2 = HCO + O$ | 3.3E13 | 0.00 | 0 |
| $CH + O = CO + H$ | 5.7E13 | 0.0 | 0 |
| $CH + OH = HCO + H$ | 3.0E13 | 0.0 | 0 |
| $CH + CO_2 = HCO + CO$ | 3.4E12 | 0.0 | 690 |
| $CH + H = C + H_2$ | 1.5E14 | 0.0 | 0 |
| $CH + H_2O = CH_2O + H$ | 1.17E15 | -0.75 | 0 |
| $CH + CH_2 = C_2H_2 + H$ | 4.0E13 | 0.0 | 0 |
| $CH + CH_3 = C_2H_3 + H$ | 3.0E13 | 0.0 | 0 |
| $CH + CH_4 = C_2H_4 + H$ | 6.0E13 | 0.0 | 0 |
| $C + O_2 = CO + O$ | 2.0E13 | 0.0 | 0 |
| $C + OH = CO + H$ | 5.0E13 | 0.0 | 0 |
| $C + CH_3 = C_2H_2 + H$ | 5.0E13 | 0.0 | 0 |
| $C + CH_2 = C_2H + H$ | 5.0E13 | 0.0 | 0 |
| $CH_2 + CO_2 = CH_2O + CO$ | 1.1E11 | 0.0 | 1000 |
| $CH_2 + O = CO + H + H$ | 5.0E13 | 0.0 | 0 |
| $CH_2 + O = CO + H_2$ | 3.0E13 | 0.0 | 0 |
| $CH_2 + O_2 = CO_2 + H + H$ | 1.6E12 | 0.0 | 1000 |
| $CH_2 + O_2 = CH_2O + O$ | 5.0E13 | 0.0 | 9000 |
| $CH_2 + O_2 = CO_2 + H_2$ | 6.9E11 | 0.0 | 500 |
| $CH_2 + O_2 = CO + H_2O$ | 1.9E10 | 0.0 | -1000 |
| $CH_2 + O_2 = CO + OH + H$ | 8.6E10 | 0.0 | -500 |
| $CH_2 + O_2 = HCO + OH$ | 4.3E10 | 0.0 | -500 |
| $CH_2O + OH = OHCO + H_2O$ | 3.43E9 | 1.18 | -447 |
| $CH_2O + H = HCO + H_2$ | 2.19E8 | 1.77 | 3000 |
| $CH_2O + M = HCO + H + M$ | 3.31E16 | 0.0 | 81000 |
| $CH_2O + O = HCO + OH$ | 1.8E13 | 0.0 | 3080 |
| $HCO + OH = H_2 + CO$ | 1.0E14 | 0.0 | 0 |
| $HCO + M = H + CO + M$ | 2.5E14 | 0.0 | 16802 |
| $CO/1.9/H_2/1.9/CH_4/2.8/CO_2/3./H_2O/5./$ | | | |
| $HCO + H = CO + H_2$ | 1.19E13 | 0.25 | 0 |
| $HCO + O = CO + OH$ | 3.0E13 | 0.0 | 0 |
| $HCO + O = CO_2 + H$ | 3.0E13 | 0.0 | 0 |
| $HCO + O_2 = HO_2 + CO$ | 3.3E13 | -0.4 | 0 |
| $CO + O + M = CO_2 + M$ | 6.17E14 | 0.0 | 3000 |
| $CO + OH = CO_2 + H$ | 1.51E7 | 1.3 | -758 |
| $CO + O_2 = CO_2 + O$ | 1.6E13 | 0.0 | 41000 |
| $HO_2 + CO = CO_2 + OH$ | 5.8E13 | 0.0 | 22934 |
| $C_2H_6 + CH_3 = C_2H_5 + CH_4$ | 5.5E-1 | 4.0 | 8300 |
| $C_2H_6 + H = C_2H_5 + H_2$ | 5.4E2 | 3.5 | 5210 |
| $C_2H_6 + O = C_2H_5 + OH$ | 3.0E7 | 2.0 | 5115 |
| $C_2H_6 + OH = C_2H_5 + H_2O$ | 8.7E9 | 1.05 | 1810 |
| $C_2H_4 + H = C_2H_3 + H_2$ | 1.1E14 | 0.0 | 8500 |
| $C_2H_4 + O = CH_3 + HCO$ | 1.6E9 | 1.2 | 746 |
| $C_2H_4 + OH = C_2H_3 + H_2O$ | 2.02E13 | 0.0 | 5955 |
| $CH_2 + CH_3 = C_2H_4 + H$ | 3.0E13 | 0.0 | 0 |
| $H + C_2H_4 = C_2H_5$ | 2.21E13 | 0.0 | 2066 |
| $C_2H_5 + H = CH_3 + CH_3$ | 1.0E14 | 0.0 | 0 |
| $C_2H_5 + O_2 = C_2H_4 + HO_2$ | 8.4E11 | 0.0 | 3875 |
| $C_2H_2 + O = CH_2 + CO$ | 1.02E7 | 2.0 | 1900 |
| $H_2 + C_2H = C_2H_2 + H$ | 4.09E5 | 2.39 | 864 |
| $H + C_2H_2 = C_2H_3$ | 5.54E12 | 0.0 | 2410 |
| $C_2H_3 + H = C_2H_2 + H_2$ | 4.0E13 | 0.0 | 0 |
| $C_2H_3 + O_2 = CH_2O = HCO$ | 4.0E12 | 0.0 | -250 |
| $C_2H_3 + OH = C_2H_2 + H_2O$ | 5.0E12 | 0.0 | 0 |
| $C_2H_3 + CH_2 = C_2H_2 + CH_3$ | 3.0E13 | 0.0 | 0 |
| $C_2H_3 + C_2H = C_2H_2 + C_2H_2$ | 3.0E13 | 0.0 | 0 |
| $C_2H_3 + CH = CH_2 + C_2H_2$ | 5.0E13 | 0.0 | 0 |
| $C_2H_2 + OH = C_2H + H_2O$ | 3.37E7 | 2.0 | 14000 |
| $C_2H_2 + OH = CH_3 + CO$ | 4.83E-4 | 4.0 | -2000 |
| $C_2H_2 + O = C_2H + OH$ | 3.16E15 | -0.6 | 15000 |
| $C_2H + O_2 = HCO + CO$ | 5.0E13 | 0.0 | 1500 |
| $C_2H + O = CH + CO$ | 5.0E13 | 0.0 | 0 |
| $CH_2 + CH_2 = C_2H_2 + H_2$ | 4.0E13 | 0.0 | 0 |
| $C_2H_2 + M = C_2H + H + M$ | 4.2E16 | 0.0 | 107000 |
| $C_2H_4 + M = C_2H_2 + H_2 + M$ | 1.5E15 | 0.0 | 55800 |
| $C_2H_4 + M = C_2H_3 + H + M$ | 1.4E15 | 0.0 | 82360 |
| $H_2 + O_2 = 2OH$ | 1.7E13 | 0.0 | 47780 |
| $OH + H_2 = H_2O + H$ | 1.17E9 | 1.3 | 3626 |
| $O + OH = O_2 + H$ | 4.0E14 | -0.5 | 0 |
| $O + H_2 = OH + H$ | 5.06E4 | 2.67 | 6290 |
| $H + O_2 + M = HO_2 + M$ | 3.61E17 | -0.72 | 0 |
| $H_2O/18.6/CO_2/4.2/H_2/2.9/CO/2.1/N_2/1.3/$ | | | |
| $OH + HO_2 = H_2O + O_2$ | 2.0E13 | 0.0 | 0 |
| $H + HO_2 = 2OH$ | 1.4E14 | 0.0 | 1073 |
| $O + HO_2 = O_2 + OH$ | 1.4E13 | 0.0 | 1073 |
| $2OH = O + H_2O$ | 6.0E8 | 1.3 | 0 |
| $H + H + M = H_2 + M$ | 1.0E18 | -1.0 | 0 |
| $H_2/0.0/H_2O/0.0/CO_2/0.0/$ | | | |
| $H + H + H_2 = H_2 + H_2$ | 9.2E16 | -0.6 | 0 |
| $H + H + H_2O = H_2 + H_2O$ | 6.0E19 | -1.25 | 0 |
| $H + H + CO_2 = H_2 + CO_2$ | 5.49E20 | -2.0 | 0 |
| $H + OH + M = H_2O + M$ | 1.6E22 | -2.0 | 0 |
| $H_2O/5/$ | | | |
| $H + O + M = OH + M$ | 6.2E16 | -0.6 | 0 |
| $H_2O/5/$ | | | |
| $O + O + M = O_2 + M$ | 1.89E13 | 0.0 | -1788 |
| $H + HO_2 = H_2 + O_2$ | 1.25E13 | 0.0 | 0 |
| $HO_2 + HO_2 = H_2O_2 + O_2$ | 2.0E12 | 0.0 | 0 |
| $H_2O_2 + M = OH + OH + M$ | 1.3E17 | 0.0 | 45500 |
| $H_2O_2 + H = HO_2 + H_2$ | 1.6E12 | 0.0 | 3800 |
| $H_2O_2 + OH = H_2O + HO_2$ | 1.0E13 | 0.0 | 1800 |
| $CH + N_2 = HCN + N$ | 3.0E11 | 0.0 | 13600 |
| $CN + N = C + N_2$ | 1.04E15 | -0.5 | 0 |
| $CH_2 + N_2 = HCN + NH$ | 1.0E13 | 0.0 | 74000 |
| $C + NO = CN + O$ | 6.6E13 | 0.0 | 0 |
| $CH + NO = HCN + O$ | 1.1E14 | 0.0 | 0 |
| $CH_2 + NO = HCNO + H$ | 1.39E12 | 0.0 | -1100 |
| $CH_3 + NO = HCN + H_2O$ | 1.0E11 | 0.0 | 15000 |
| $HCNO + H = HCN + OH$ | 5.0E13 | 0.0 | 12000 |
| $CH_2 + N = HCN + H$ | 1.0E14 | 0.0 | 0 |
| $CH + N = CN + H$ | 1.3E13 | 0.0 | 0 |
| $CO_2 + N = NO + CO$ | 1.9E11 | 0.0 | 3400 |
| $C_2H_3 + N = HCN + CH_2$ | 2.0E13 | 0.0 | 0 |
| $HCN + OH = CN + H_2O$ | 1.45E13 | 0.0 | 10929 |
| $OH + HCN = HOCN + H$ | 5.85E4 | 2.4 | 12500 |
| $OH + HCN = HNCO + H$ | 1.98E-4.0 | 1000 | |
| $OH + HCN = NH_2 + CO$ | 7.83E-4 | 4.0 | 4000 |
| $HOCN + H = HNCO + H$ | 1.0E13 | 0.0 | 0 |
| $HCN + O = NCO + H$ | 1.38E4 | 2.64 | 4980 |
| $HCN + O = NH + CO$ | 3.45E3 | 2.64 | 4980 |
| $HCN + O = CN + OH$ | 2.7E9 | 1.58 | 26600 |
| $CN + H_2 = HCN + H$ | 2.95E5 | 2.45 | 2237 |
| $CN + O = CO + N$ | 1.8E13 | 0.0 | 0 |
| $CN + O_2 = NCO + O$ | 5.6E12 | 0.0 | 0 |
| $CN + OH = NCO + H$ | 6.0E13 | 0.0 | 0 |
| $CN + HCN = C_2N_2 + H$ | 2.0E13 | 0.0 | 0 |
| $CN + NO_2 = NCO + NO$ | 3.0E13 | 0.0 | 0 |
| $CN + N_2O = NCO + N_2$ | 1.0E13 | 0.0 | 0 |
| $C_2N_2 + O = NCO + CN$ | 4.57E12 | 0.0 | 8880 |
| $C_2N_2 + OH = HOCN + CN$ | 1.86E11 | 0.0 | 2900 |
| $HO_2 + NO = NO_2 + OH$ | 2.11E12 | 0.0 | -479 |
| $NO_2 + H = NO + OH$ | 3.5E14 | 0.0 | 1500 |
| $NO_2 + O = NO + O_2$ | 1.0E13 | 0.0 | 600 |
| $NO_2 + M = NO + O + M$ | 1.1E16 | 0.0 | 66000 |
| $NCO + H = NH + CO$ | 5.0E13 | 0.0 | 0 |

TABLE I-continued

Chemical mechanism which was used for modeling
$k_i = A \cdot T^n \exp(-E/RT)$ (kcal, cm, mol, s)
ELEMENTS: H, O, N, C, S.
SPECIES: $CH_4$, $CH_3$, $CH_2$, CH, $CH_2O$, HCO, $C_2H$, $CO_2$, CO, $H_2$, H, $O_2$, O, OH, $HO_2$, $H_2O_2$, $H_2O$, C, $C_2H_4$, $C_2H_3$, $C_2H_5$, $C_2H_6$, $C_2H_2$, $CH_3O$, $CH_2OH$, $N_2$, NO, N, NH, $NH_2$, HNO, HCN, NCO, CN, $N_2O$, NNH, $NH_3$, $N_2H_2$, $C_2N_2$, $NO_2$, $HNO_2$, HOCN, HCNO, HNCO, $SO_2$, $SO_3$, $HSO_3$, $O_3$, $CH_3OH$, $H_2O_2$(wall).

| REACTIONS | A | n | E |
|---|---|---|---|
| NCO + O = NO + CO | 2.0E13 | 0.0 | 0 |
| NCO + N = N2 + CO | 2.0E13 | 0.0 | 0 |
| NCO + OH = NO + CO + H | 1.0E13 | 0.0 | 0 |
| NCO + M = N + CO + M | 3.1E16 | −0.5 | 48000 |
| NCO + NO = N2O + CO | 1.0E13 | 0.0 | −390 |
| NCO + H2 = HNCO + H | 8.58E12 | 0.0 | 9000 |
| HNCO + H = NH2 + CO | 2.0E13 | 0.0 | 3000 |
| NH + O2 = HNO + O | 1.0E13 | 0.0 | 12000 |
| NH + O2 = NO + OH | 7.6E10 | 0.0 | 1530 |
| NH + NO = N2O + H | 2.4E15 | −0.8 | 0 |
| N2O + OH = N2 + HO2 | 2.0E12 | 0.0 | 10000 |
| N2O + H = N2 + OH | 7.6E13 | 0.0 | 15200 |
| N2O + M = N2 + O + M | 1.6E14 | 0.0 | 51600 |
| N2O + O = N2 + O2 | 1.0E14 | 0.0 | 28200 |
| N2O + O = NO + NO | 1.0E14 | 0.0 | 28200 |
| NH + OH = HNO + H | 2.0E13 | 0.0 | 0 |
| NH + OH = N + H2O | 5.0E11 | 0.5 | 2000 |
| NH + N = N2 + H | 3.0E13 | 0.0 | 0 |
| NH + H = N + H2 | 1.0E14 | 0.0 | 0 |
| NH2 + O = HNO + H | 6.63E14 | −0.5 | 0 |
| NH2 + O = NH + OH | 6.75E12 | 0.0 | 0 |
| NH2 + OH = NH + H2O | 4.0E6 | 2.0 | 1000 |
| NH2 + H = NH + H2 | 6.92E13 | 0.0 | 3650 |
| NH2 + NO = NNH + OH | 6.40E15 | −1.25 | 0 |
| NH2 + NO = N2 + H2O | 6.20E15 | −1.25 | 0 |
| NH3 + OH = NH2 + H2O | 2.04E6 | 2.04 | 566 |
| NH3 + H = NH2 + H2 | 6.36E5 | 2.39 | 10171 |
| NH3 + O = NH2 + OH | 2.1E13 | 0.0 | 9000 |
| NNH = N2 + H | 1.0E4 | 0.0 | 0 |
| NNH + NO = N2 + HNO | 5.0E13 | 0.0 | 0 |
| NNH + H = N2 + H2 | 1.0E14 | 0.0 | 0 |
| NNH + OH = N2 + H2O | 5.0E13 | 0.0 | 0 |
| NNH + NH2 = N2 + NH3 | 5.0E13 | 0.0 | 0 |
| NNH + NH = N2 + NH2 | 5.0E13 | 0.0 | 0 |
| NNH + O = N2O + H | 1.0E14 | 0.0 | 0 |
| HNO + M = H + NO + M | 1.5E16 | 0.0 | 48680 |
| H2O/10/O2/2/N2/2/H2/2/ | | | |
| HNO + OH = NO + H2O | 3.6E13 | 0.0 | 0 |
| HNO + H = H2 + NO | 5.0E12 | 0.0 | 0 |
| HNO + NH2 = NH3 + NO | 2.0E13 | 0.0 | 1000 |
| N + NO = N2 + O | 3.27E12 | 0.3 | 0 |
| N + O2 = NO + O | 6.4E9 | 1.0 | 6280 |
| N + OH = NO + H | 3.8E13 | 0.0 | 0 |
| NH + O = NO + H | 0.200E + 14 | 0.00 | 0 |
| 2HNO = N2O + H2O | 0.395E + 13 | 0.00 | 5000 |
| HNO + NO = N2O + OH | 0.200E + 13 | 0.00 | 26000 |
| NH2 + NH = N2H2 + H | 0.500E + 14 | 0.00 | 0 |
| 2NH = N2 + 2H | 0.254E + 14 | 0.00 | 0 |
| NH2 + N = N2 + 2H | 0.720E + 14 | 0.00 | 0 |
| N2H2 + M = NNH + H + M | 0.500E + 17 | 0.00 | 50000 |
| H2O/15.0/O2/2.0/N2/2.0/H2/2.0/ | | | |
| N2H2 + H = NNH + H2 | 0.500E + 14 | 0.00 | 1000 |
| N2H2 + O = NH2 + NO | 0.100E + 14 | 0.00 | 0 |
| N2H2 + O = NNH + OH | 0.200E + 14 | 0.00 | 1000 |
| N2H2 + OH = NNH + H2O | 0.100E + 14 | 0.00 | 1000 |
| N2H2 + NO = N2O + NH2 | 0.300E + 13 | 0.00 | 0 |
| N2H2 + NH = NNH + NH2 | 0.100E + 14 | 0.00 | 1000 |
| N2H2 + NH2 = NH3 + NNH | 0.100E + 14 | 0.00 | 1000 |
| 2NH2 = N2H2 + H2 | 0.500E + 12 | 0.00 | 0 |
| NH2 + O2 = HNO + OH | 0.450E + 13 | 0.00 | 25000 |
| O + O2 + M = O3 + M | 0.782E + 21 | −2.70 | 0 |
| O + O3 = O2 + O2 | 0.282E + 13 | 0.00 | 4094 |
| NO + OH + M = HNO2 + M | 0.233E + 24 | −2.40 | 0 |
| OH + HNO2 = H2O + NO2 | 0.108E + 14 | 0.00 | 775 |
| NO + O3 = NO2 + O2 | 0.121E + 13 | 0.00 | 2782 |
| SO2 + O + M = SO3 + M | 0.145E + 17 | 0.00 | 2000 |
| SO2 + OH + M = HSO3 + M | 0.566E + 24 | −2.60 | 0 |
| HSO3 + O2 = HO2 + SO3 | 0.783E + 12 | 0.00 | 656 |
| CH3OH = CH3 + OH | 0.190E + 17 | 0.00 | 91780 |
| CH3OH = CH2OH + H | 0.154E + 17 | 0.00 | 96790 |
| CH3OH + OH = CH2OH + H2O | 0.177E + 05 | 2.65 | −883 |
| CH3OH + OH = CH3O + H2O | 0.177E + 05 | 2.65 | −883 |
| CH3OH + H = CH2OH + H2 | 0.320E + 14 | 0.00 | 6095 |
| CH3OH + H = CH3O + H2 | 0.800E + 13 | 0.00 | 6095 |
| CH3OH + O = CH2OH + OH | 0.388E + 06 | 2.50 | 3080 |
| CH3OH + HO2 = CH2OH + H2O2 | 0.398E + 14 | 0.00 | 19400 |
| CH3OH + CH3 = CH2OH + CH4 | 0.319E + 02 | 3.17 | 7172 |
| CH3OH + CH3 = CH3O + CH4 | 0.145E + 02 | 3.10 | 6935 |
| CH2OH + CH2OH = CH3OH + CH2O | 0.120E + 14 | 0.00 | 0 |
| CH2OH + HCO = CH3OH + CO | 0.120E + 15 | 0.00 | 0 |
| H2O2(wall) => H2O + 0.5 O2 | 0.550E + 01 | 0.00 | 2500 |

Example 1

Hydrogen peroxide was injected into a gas stream having the following composition:

| Component | Concentration |
|---|---|
| NO | 100 ppm |
| $H_2O_2$ | 200 ppm |
| $O_2$ | 4.2% |
| $H_2O$ | 5.4% |
| $N_2$ | Balance |

The reaction time was 1.6 seconds (s) and the pressure was held at 1 atmosphere (atm). The temperature was set at a constant 750 K (477° C.). It was found under these conditions that at the end of 1.6 seconds, the NO was reduced from 100 ppm to 4 ppm. This example illustrates that at temperatures in excess of 650 K (377° C.), oxidation of NO to $NO_2$ takes place in the presence of $H_2O_2$.

Example 2

In this example, the experiment described in Example 1 was repeated, however, the temperature was 1100 K (827° C.) and the reaction time was 1.0 s. It was found under these conditions that at the end of 1.0 s, the NO was reduced from 100 ppm to 80 ppm. This example illustrates that at temperatures of about 1100 K (827° C.) and higher there is no effective $NO$-to-$NO_2$ conversion.

Example 3

In this example, the experiment described in Example 1 was repeated, however, the temperature was 600 K (327° C.) and the reaction time was 2.0 s. It was found under these conditions that at the end of 2.0 s, the NO was reduced from 100 ppm to 70 ppm. This example illustrates that at temperatures of about 600 K (327° C.) and lower there is no effective $NO$-to-$NO_2$ conversion.

Example 4

Hydrogen peroxide was injected into a gas stream having the following composition:

| Component | Concentration |
|---|---|
| NO | 200 ppm |
| $H_2O_2$ | 300 ppm |
| CO | 24 ppm |
| $O_2$ | 3% |
| $H_2O$ | 15% |
| $CO_2$ | 8% |
| $N_2$ | Balance |

The reaction time was 1.0 s and the pressure was held at 1 atm. The temperature was set at a constant of 800 K (527° C.). It was found under these conditions that at the end of 1.0 s., the NO was reduced from 200 ppm to 20 ppm. There were no visible CO concentration changes. This example illustrates that at a temperature of about 800 K (527° C.), oxidation of NO to $NO_2$ takes place in the presence of $H_2O_2$, but the temperature is not high enough for CO oxidation.

Example 5

Hydrogen peroxide was injected into a gas stream having the following composition:

| Component | Concentration |
|---|---|
| NO | 70 ppm |
| $H_2O_2$ | 53 ppm |
| $CH_3OH$ | 52 ppm |
| CO | 35 ppm |
| $O_2$ | 3% |
| $H_2O$ | 15% |
| $CO_2$ | 8% |
| $N_2$ | Balance |

The reaction time was 1.0 s and the pressure was held at 1 atm. The temperature was set at a constant 800 K (527° C.). It was found under these conditions that at the end of 1.0 s, the NO was reduced from 70 ppm to 8 ppm. At the same time, the CO concentration increased from 35 to 85 ppm. This example illustrates that at a temperature of about 800 K (527° C.), oxidation of NO to $NO_2$ takes place in the presence of a mixture of $H_2O_2$ and methanol, but the methanol is converted to CO.

Example 6

In this example, the experiment described in Example 5 was repeated, however, the initial $H_2O_2$ concentration was 84 ppm and the initial $CH_3OH$ concentration was 21 ppm with the same $H_2O_2+CH_3OH$ level of 105 ppm. It was found under these conditions that the NO was reduced from 70 ppm to 17 ppm. At the same time, the CO concentration increased from 35 to 58 ppm. This example illustrates that at a temperature of about 800 K (527° C.), oxidation of NO to $NO_2$ takes place at various $H_2O_2$ to $CH_3OH$ ratios, but at any initial $CH_3OH$ concentration almost all $CH_3OH$ is converted to CO.

Example 7

Hydrogen peroxide was injected into a gas stream having the following composition:

| Component | Concentration |
|---|---|
| $SO_3$ | 100 ppm |
| $H_2O_2$ | 200 ppm |
| $O_2$ | 4.2% |
| $H_2O$ | 5.4% |
| $N_2$ | Balance |

The reaction time was 1.3 s and the pressure was held at 1 atm. The temperature was set at a constant 840 K (567° C.). It was found under these conditions that at the end of 1.3 s, about 90 ppm $SO_2$ was formed from the $SO_3$. This example illustrates that at temperatures of about 840 K (567° C.) and higher, $SO_3$ to $SO_2$ conversion takes place in the presence of $H_2O_2$.

Example 8

In this example, the experiment described in Example 7 was repeated, however, the temperature was 1100 K (827° C.) and the reaction time was 1.0 s. It was found under these conditions that at the end of 1.0 s, the $SO_2$ was not formed. This example illustrates that at temperatures of about 1100 K (827° C.) and higher, there is no effective $SO_3$-to-$SO_2$ conversion due to $H_2O_2$ injection.

Example 9

In this example, the experiment described in Example 7 was repeated, however, the temperature was 700 K (427° C.) and the reaction time was 1.6 s. It was found under these conditions that at the end of 1.6 s, the $SO_2$ was not formed. This example illustrates that at temperatures of about 700 K (427° C.) and lower, there is no effective $SO_3$ to $SO_2$ conversion.

Example 10

Hydrogen peroxide was injected into a gas stream having the following composition:

| Component | Concentration |
|---|---|
| CO | 90 ppm |
| $H_2O_2$ | 180 ppm |
| $O_2$ | 4.2% |
| $H_2O$ | 5.4% |
| $N_2$ | Balance |

The reaction time was 1.3 s and the pressure was held at 1 atm. The temperature was set at a constant 900 K (627° C.). It was found under these conditions that at the end of 1.3 s, the CO concentration was reduced to about 68 ppm. This example illustrates that at a temperature of about 900 K (627° C.), the CO concentration is reduced in the presence of $H_2O_2$. Under the same conditions but without hydrogen peroxide, the temperature was not high enough for CO oxidation by molecular oxygen.

Example 11

Hydrogen peroxide was injected into a gas stream having the following composition:

| Component | Concentration |
|---|---|
| CH$_4$ | 90 ppm |
| H$_2$O$_2$ | 180 ppm |
| O$_2$ | 4.2% |
| H$_2$O | 5.4% |
| N$_2$ | Balance |

The reaction time was 1.3 s and the pressure was held at 1 atm. The temperature was set at a constant of 1000 K (727° C.). It was found under these conditions that at the end of 1.3 s, the CH$_4$ concentration was reduced to about 4 ppm. This example illustrates that at a temperature of about 1000 K (727° C.), the CH$_4$ concentration is reduced in the presence of H$_2$O$_2$. Under the same conditions but without hydrogen peroxide, the temperature was not high enough for CH$_4$ oxidation by molecular oxygen.

Example 12

Hydrogen peroxide was injected into a gas stream having the following composition:

| Component | Concentration |
|---|---|
| Hg | 0.1 ppm |
| SO$_3$ | 20 ppm |
| SO$_2$ | 2000 ppm |
| NO | 200 ppm |
| H$_2$O$_2$ | 400 ppm |
| O$_2$ | 3% |
| CO$_2$ | 8% |
| H$_2$O | 15% |
| N$_2$ | Balance |

Reaction (6), Hg+HO$_2$→HgO+OH, with a rate constant of k=10$^{13.5}$ cc/mol.s, was added to the mechanism set forth in Table I at temperatures of 800 K (527° C.) and 900 K (627° C.). A substantially complete Hg removal was found within a reaction time of about 0.04 and 0.01 s, respectively. At the same time, the NO-to-NO$_2$ and SO$_3$-to-SO$_2$ conversions took place. This example illustrates that Hg removal is effective at temperatures between about 700 K (427° C.) and 1000 K (727° C.).

Example 13

In this example, the model experiment described in Example 12 was run at different temperatures and at varying rate constants for the reaction (6). It was found that the variation of the rate constant within an order of magnitude does not significantly affect Hg removal. While the efficiency of Hg removal decreases at lower rate constants, even at a rate constant of 10$^{11.5}$ cc/mol.s (which is two orders of magnitude lower than the value used in Example 12), substantially complete Hg removal can be achieved at a temperature of 800 K (527° C.).

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed and desired to be secured by United States Letters Patent is:

1. A method for removing gas components from a combustion flue gas including one or more of NO, SO$_3$, CO, light hydrocarbons, and mercury vapor, the method comprising the step of contacting the combustion flue gas with an injection liquid including atomized droplets of a mixture of aqueous hydrogen peroxide solution having a concentration from about 1% to about 50% and methanol in an amount such that the mole ratio of the sum of the hydrogen peroxide and methanol to the sum of any such NO, SO$_3$, CO, light hydrocarbons and mercury vapor contained in the combustion flue gas is in a range from about 0.5 to about 2, and the concentration of the mixture of hydrogen peroxide and methanol in the combustion flue gas is less than about 1000 ppm, at a flue gas temperature in a range from about 650 K (377° C.) to about 1100 K (827° C.), wherein the mixture of hydrogen peroxide and methanol substantially converts any NO, SO$_3$, CO, light hydrocarbons, and mercury vapor in the combustion flue gas to NO$_2$, SO$_2$, CO$_2$, and HgO by a chain propagating reaction in the combustion flue gas.

2. The method of claim 1, wherein the combustion flue gas further comprises initial concentrations of carbon dioxide, water and oxygen.

3. The method of claim 1, wherein the mole ratio of the mixture of hydrogen peroxide and methanol to NO is in a range from about 0.5 to about 2.

4. The method of claim 1, wherein the initial concentration of SO$_3$ in the flue gas is up to about 100 ppm.

5. The method of claim 1, wherein the initial concentration of CO in the flue gas is up to about 500 ppm.

6. The method of claim 1, wherein the initial concentration of light hydrocarbons in the flue gas is up to about 1000 ppm.

7. The method of claim 1, wherein the initial concentration of Hg in the flue gas is less than about 1 ppm.

8. The method of claim 1, wherein the mixture of hydrogen peroxide and methanol is injected into the flue gas upstream of a particulate control device.

9. The method of claim 1, wherein the reaction time of the mixture of hydrogen peroxide and methanol and the gas components is between about 0.01 to about 5 seconds.

10. The method of claim 1, further comprising the step of removing the NO$_2$, SO$_2$, and HgO from the combustion flue gas.

11. The method of claim 1, wherein the mixture of hydrogen peroxide and methanol is propelled into the flue gas by a jet of gas.

12. The method of claim 1, wherein the flue gas temperature is in the range from about 700 K (427° C.) to about 1000 K (727° C.).

13. A method for removing gas components from a combustion flue gas including one or more of NO, SO$_3$, CO, light hydrocarbons, and mercury vapor, the method comprising the step of contacting the combustion flue gas with an injection liquid including atomized droplets of a mixture of aqueous hydrogen peroxide solution having a concentration from about 10% to about 30% and methanol in an amount such that the mole ratio of the sum of the hydrogen peroxide and methanol to the sum of any such NO, SO$_3$, CO, light hydrocarbons and mercury vapor contained in the combustion flue gas is in a range from about 0.5 to about 2, and the concentration of the mixture of hydrogen peroxide and methanol in the combustion flue gas is less than about 500 ppm, at a flue gas temperature in a range from about 650 K (377° C.) to about 1100 K (827° C.), wherein the mixture of hydrogen peroxide and methanol substantially converts any NO, SO$_3$, CO, light hydrocarbons, and mercury vapor in the combustion flue gas to NO$_2$, SO$_2$, CO$_2$, and HgO by a chain propagating reaction in the combustion flue gas.

14. The method of claim 13, wherein the combustion flue gas further comprises initial concentrations of carbon dioxide, water, and oxygen.

15. The method of claim 13, wherein the mole ratio of the mixture of hydrogen peroxide and methanol to NO is in a range from about 0.5 to about 2.

16. The method of claim 13, wherein the initial concentration of $SO_3$ in the flue gas is up to about 100 ppm.

17. The method of claim 13, wherein the initial concentration of CO in the flue gas is up to about 500 ppm.

18. The method of claim 13, wherein the initial concentration of light hydrocarbons in the flue gas is up to about 1000 ppm.

19. The method of claim 13, wherein the initial concentration of mercury in the flue gas is less than about 1 ppm.

20. The method of claim 13, wherein the mixture of hydrogen peroxide and methanol is injected into the flue gas upstream of a particulate control device.

21. The method of claim 13, wherein the reaction time of the mixture of hydrogen peroxide and methanol and the gas components is between about 0.01 to about 5 seconds.

22. The method of claim 13, further comprising the step of removing the $NO_2$, $SO_2$, and HgO from the combustion flue gas.

23. The method of claim 13, wherein the mixture of hydrogen peroxide and methanol is atomized and propelled into the flue gas by a jet of gas.

24. The method of claim 13, wherein the flue gas temperature is in the range from about 700 K (427° C.) to about 1000 K (727° C.).

* * * * *

UNITED STATES PATENT AND TRADEMARK OFFICE
CERTIFICATE OF CORRECTION

PATENT NO. : 5,670,122

DATED : September 23, 1997

INVENTOR(S) : Vladimir M. Zamansky; Loc Ho; William Randall Seeker

It is certified that error appears in the above-identified patent and that said Letters Patent is hereby corrected as shown below:

Col. 11, line 64, change "cc/mol.s." to --cc/mol·s.--

Col. 12, line 66, change "$CH_2OH + M + CH_2O + H + M$"
to --$CH_2OH + M = CH_2O + H + M$--

Col. 13, line 39, change "$CH_2O + OH = OHCO + H_2O$" to --$CH_2O + OH = HCO + H_2O$--

Col. 14, line 37, change "$HO_2 + HO_2 = H_2O2 + O_2$" to --$HO_2 + HO_2 = H_2O_2 + O_2$--

Col. 14, line 51, after "$OH + HCN = NH_2 + CO$" change "1.98E - 4.0    1000"
to --1.98E-3    4.0    1000--

Col. 16, line 19, change "$CH_3OH + CH_3 =_{CH2}OH + CH_4$"
to --$CH_3OH + CH_3 = CH_2OH + CH_4$--

Col. 19, line 36, change "cc/mol.s," to --cc/mol·s,--

Col. 19, line 52, change "cc/mol.s" to --cc/mol·s--

Signed and Sealed this

Twenty-eighth Day of July, 1998

Attest:

BRUCE LEHMAN

*Attesting Officer*          *Commissioner of Patents and Trademarks*